United States Patent
Hu et al.

(10) Patent No.: US 11,958,209 B2
(45) Date of Patent: Apr. 16, 2024

(54) DELIGNIFIED WOOD MATERIALS, AND METHODS FOR FABRICATING AND USE THEREOF

(71) Applicant: University of Maryland, College Park, College Park, MD (US)

(72) Inventors: Liangbing Hu, Potomac, MD (US); Tian Li, Silver Spring, MD (US); Jianwei Song, College Park, MD (US); Chaoji Chen, Hyattsville, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 829 days.

(21) Appl. No.: 16/647,154

(22) PCT Filed: Sep. 14, 2018

(86) PCT No.: PCT/US2018/051091
§ 371 (c)(1),
(2) Date: Mar. 13, 2020

(87) PCT Pub. No.: WO2019/055789
PCT Pub. Date: Mar. 21, 2019

(65) Prior Publication Data
US 2020/0238565 A1 Jul. 30, 2020

Related U.S. Application Data

(60) Provisional application No. 62/559,147, filed on Sep. 15, 2017, provisional application No. 62/725,810, filed on Aug. 31, 2018.

(51) Int. Cl.
*B27K 3/20* (2006.01)
*B27K 3/42* (2006.01)
(Continued)

(52) U.S. Cl.
CPC ............ *B27K 3/20* (2013.01); *B27K 3/42* (2013.01); *B27K 5/0005* (2013.01); *B27K 5/007* (2013.01);
(Continued)

(58) Field of Classification Search
CPC .......... B27K 3/20; B27K 3/42; B27K 5/0005; B27K 5/007; B27K 2240/10;
(Continued)

(56) References Cited

U.S. PATENT DOCUMENTS 2,123,409 A 7/1938 Armin
3,159,554 A 12/1964 Mount
(Continued)

FOREIGN PATENT DOCUMENTS

CA 1066697 A 11/1979
CN 105002232 A 10/2015
(Continued)

OTHER PUBLICATIONS

Office Action, dated Apr. 19, 2023 (Apr. 19, 2023), in European Patent Application No. 18855607.0. (6 pages).
(Continued)

*Primary Examiner* — Kevin R Kruer
(74) *Attorney, Agent, or Firm* — RowanTree Law Group, PLLC; Frederick F. Rosenberger

(57) ABSTRACT

A delignified wood material is formed by removing substantially all of the lignin from natural wood. The resulting delignified wood retains cellulose-based lumina of the natural wood, with nanofibers of the cellulose microfibrils being substantially aligned along a common direction. The unique microstructure and composition of the delignified wood can provide advantageous thermal insulation and mechanical properties, among other advantages described herein. The thermal and mechanical properties of the delignified wood
(Continued)

material can be tailored by pressing or densifying the delignified wood, with increased densification yielding improved strength and thermal conductivity. The chemical composition of the delignified wood also offers unique optical properties that enable passive cooling under solar illumination.

20 Claims, 11 Drawing Sheets

(51) Int. Cl.
  *B27K 5/00* (2006.01)
  *B32B 21/13* (2006.01)

(52) U.S. Cl.
  CPC .......... *B32B 21/13* (2013.01); *B27K 2240/10* (2013.01); *B27K 2240/70* (2013.01)

(58) Field of Classification Search
  CPC ...... B27K 2240/70; B27K 1/00; B27K 3/346; B27K 5/001; B27K 5/02; B27K 5/065; B27K 3/153; B27K 3/163; B27K 3/22; B27K 3/34; B27K 3/0278; B27K 3/0207; B27K 2240/60; B32B 21/13; F26B 5/06
  See application file for complete search history.

(56) References Cited

U.S. PATENT DOCUMENTS

| | | | |
|---|---|---|---|
| 4,858,399 | A | 8/1989 | Salato, Jr. |
| 4,908,099 | A | 3/1990 | DeLong |
| 5,188,707 | A | 2/1993 | Gordy |
| 5,632,123 | A | 5/1997 | Erwin |
| 5,852,880 | A | 12/1998 | Harrison |
| 7,008,515 | B1 | 3/2006 | Husson, Jr. et al. |
| 9,138,965 | B2 | 9/2015 | Hu et al. |
| 9,174,355 | B2 | 11/2015 | Rector et al. |
| 2005/0008530 | A1 | 1/2005 | Caserta et al. |
| 2007/0029246 | A1 | 2/2007 | Ueda |
| 2008/0146701 | A1 | 6/2008 | Sain et al. |
| 2008/0186801 | A1 | 8/2008 | Liu et al. |
| 2015/0232703 | A1* | 8/2015 | Nelson ................ C08B 37/0057 523/210 |
| 2017/0043497 | A1 | 2/2017 | Burgert et al. |
| 2018/0043278 | A1 | 2/2018 | Singamaneni |
| 2018/0264414 | A1 | 9/2018 | Hu et al. |
| 2018/0342702 | A1 | 11/2018 | Hu et al. |
| 2018/0356127 | A1 | 12/2018 | Hu et al. |
| 2018/0370071 | A1 | 12/2018 | Boitouzet et al. |
| 2020/0223091 | A1 | 7/2020 | Hu et al. |
| 2020/0282591 | A1 | 9/2020 | Hu et al. |
| 2021/0088252 | A1* | 3/2021 | Hu ......................... C02F 1/283 |

FOREIGN PATENT DOCUMENTS

| | | |
|---|---|---|
| EP | 1809825 A1 | 7/2007 |
| FR | 61548 E | 5/1955 |
| IN | 2018/17022033 A | 10/2018 |
| JP | 2004-330141 A | 11/2004 |
| WO | WO 1991/001409 A1 | 2/1991 |
| WO | WO 2016/141432 A1 | 9/2016 |
| WO | WO 2017/136714 A1 | 8/2017 |
| WO | WO 2018/187238 A1 | 10/2018 |
| WO | WO 2018/191181 A1 | 10/2018 |

OTHER PUBLICATIONS

Office Action, dated Sep. 7, 2021, in Chinese Patent Application No. 201880073116.4. (34 pages).
Chen et al., "Thermal behavior of extracted and delignified pine wood flour," *Thermochimica Acta*, 2014, 591: pp. 40-44. (5 pages).
Guan et al., "Highly Compressible Wood Sponges with a Spring-like Lamellar Structure as Effective and Reusable Oil Absorbents," *ACS Nano*, 2018, 12: pp. 10365-10373. (9 pages).
Ilyas et al., "Effect of Delignification on the Physical, Thermal, Chemical, and Structural Properties of Sugar Palm Fibre," *BioResources*, 2017, 12(4): 8734-54. (21 pages).
Yang et al., "Composite phase change materials with good reversible thermochromic ability in delignified wood substrate for thermal energy storage," *Applied Energy*, 2018, 212: pp. 455-464. (10 pages).
Office Action, dated Sep. 14, 2022 (Sep. 14, 2022), in Australian Patent Application No. 2018331479. (5 pages).
International Search Report and Written Opinion, dated Jan. 7, 2019, in International Application No. PCT/US18/51091.
Ali et al., "The structure and mechanics of nanofibrillar cellulose foams," *Soft Matter*, 2013, 9: pp. 1580-1588. (9 pages).
Blanchette et al., "Changes in structural and chemical components of wood delignified by fungi," *Wood Science and Technology*, 1985, 19: pp. 35-46. (12 pages).
Burgert et al., "Bio-inspired functional wood-based materials—hybrids and replicates," *International Materials Reviews*, 2015, 60(8): pp. 431-450. (21 pages).
Chen et al., "Scalable and Sustainable Approach toward Highly Compressible, Anisotropic, Lamellar Carbon Sponge," *Chem*, 2018, 4: pp. 544-554. (12 pages).
Deville et al., "Freezing as a Path to Build Complex Composites," *Science*, 2006, 311 (5760): pp. 515-518. (6 pages).
Fang et al., "Densification of wood veneers by compression combined with heat and steam," *Eur. J. Wood Prod.*, 2012, 70: pp. 155-163. (9 pages).
Fratzl, P., "Wood made denser and stronger," *Nature*, Feb. 2018, 554: pp. 172-173. (2 pages).
Frey et al., "Delignified and Densified Cellulose Bulk Materials with Excellent Tensile Properties for Sustainable Engineering," *ACS Appl. Mater. Interfaces*, 2018, 10: pp. 5030-5037. (8 pages).
Guo et al., "Anisotropic thermal transport in highly ordered $TiO_2$ nanotube arrays," *Journal of Applied Physics*, 2009, 106: 123526. (7 pages).
He et al., "An Energy-Efficient, Wood-Derived Structural Material Enabled by Pore Structure Engineering towards Building Efficiency," *Small Methods*, 2020, 4:1900747. (8 pages).
Jia et al., "Anisotropic, Mesoporous Microfluidic Frameworks with Scalable, Aligned Cellulose Nanofibers," *ACS Applied Materials & Interfaces*, 2018, 10: pp. 7362-7370. (9 pages).
Li et al., "A radiative cooling structural material," *Science*, 2019, 364: pp. 760-763. (5 pages).
Li et al., "Anisotropic, lightweight, strong, and super thermally insulating nanowood with naturally aligned nanocellulose," *Sci. Adv.*, 2018, 4: eaar3724. (10 pages).
Li et al., "Strong and superhydrophobic wood with aligned cellulose nanofibers as a waterproof structural material," *Chinese Journal of Chemistry*, 2020, 38(8): pp. 823-829. (7 pages).
Li et al., "Wood Composite as an Energy Efficient Building Material: Guided Sunlight Transmittance and Effective Thermal Insulation," *Advanced Energy Materials*, 2016, 6: 1601122. (7 pages).
Li et al., "Wood-Polymer Composites Prepared by the In Situ Polymerization of Monomers Within Wood," *Journal of Applied Polymer Science*, 2011, 119: pp. 3207-3216. (10 pages).
Office Action, dated Feb. 2, 2021, in Chinese Application No. 201880073116.4. (35 pages).
Office Action, dated May 18, 2021, in European Application No. 18855607.0. (10 pages).
Ruel et al., "The wood cell wall at the ultrastructural scale—formation and topochemical organization," *Maderas. Ciencia y tecnologia*, 2006, 8(2): pp. 107-116. (10 pages).
Sacui et al., "Comparison of the Properties of Cellulose Nanocrystals and Cellulose Nanofibrils Isolated from Bacteria, Tunicate, and Wood Processed Using Acid, Enzymatic, Mechanical, and Oxidative Methods," *ACS Applied Materials & Interfaces*, 2014, 6: pp. 6127-6138. (12 pages).

(56) References Cited

OTHER PUBLICATIONS

Solar et al., "Alkaline and alkaline/oxidation pre-treatments of spruce wood. Part 1: Chemical alterations of wood and its digestibility under conditions of Kraft cook," Wood Research, 2009, 54(4): pp. 1-12. (12 pages).
Song et al., "Highly Compressible, Anisotropic Aerogel with Aligned Cellulose Nanofibers," ACS Nano, 2018, 12: pp. 140-147. (8 pages).
Song et al., "Processing bulk natural wood into a high-performance structural material," Nature, Feb. 2018, 544: pp. 224-228. (16 pages).
White, R. H., "Effect of lignin content and extractives on the higher heating value of wood," Wood Fiber Sci., Oct. 1987, 19(4): pp. 446-452. (7 pages).
Zhu et al., "Anisotropic, transparent films with aligned cellulose nanofibers," Advanced Materials, 2017, 29: 1606284. (8 pages).
Zhu et al., "Highly Anisotropic, Highly Transparent Wood Composites," Advanced Materials, 2016, 28: pp. 5181-5157. (7 pages).
Zhu et al., "Integrated production of nano-fibrillated cellulose and cellulosic biofuel (ethanol) by enzymatic fractionation of wood fibers," Green Chemistry, 2011, 13: pp. 1339-1344. (6 pages).
Zhu et al., "Transparent and haze wood composites for highly efficient broadband light management in solar cells," Nano Energy, 2016, 26: pp. 332-339. (8 pages).
Zhu et al., "Wood-Derived Materials for Green Electronics, Biological Devices, and Energy Applications," Chemical Reviews, 2016, 116: pp. 9305-9374. (70 pages).
"Capillary Action and Water," USGS, last accessed Apr. 18, 2022, available online at: https://www.usgs.gov/special-topic/water-science-school/science/capillary-action-and-water?qt-science_center_objects=0#qt-science_center_objects (7 pages).
"Pits: Ultra-structure, classification & functions: Simple & Bordered Pits (Similarities and Differences)," Easybiologyclass.com, last accessed Apr. 18, 2022. Available online at: https://www.easybiologyclass.com/pits-ultra-structure-classification-functions-simple-bordered-pits-similiarities-differences/ . (4 pages).
Abstract only for Jiang et al., "Bilayered biofoam for highly efficient solar steam generation," Advanced Materials, Nov. 2016, 28(42): pp. 9400-9407. (2 pages).
Abstract only for Lee et al., "Nanostructure and surface composition of Pt and Ru binary catalysts on polyaniline-functionalized carbon nanotubes," Langmuir, Oct. 2011, 27(23): pp. 14654-14661. (2 pages).
Abstract only for Liu et al., "A bioinspired, reusable, paper-based system for high-performance large-scale evaporation," Advanced Materials, May 2015, 27(17): pp. 2768-2774. (1 page).
Abstract only for Yano et al., "High Strength Wood-based Materials," Cellulose Communications, 2003, 10(1) pp. 22-27. (6 pages).
Chen et al., "All-wood, low tortuosity, aqueous, biodegradable supercapacitors with ultra-high capacitance," Energy & Environmental Science, 2017, 10: pp. 538-545. (8 pages).
Chen et al., "Highly flexible and efficient solar steam generation device," Advanced Materials, 2017, 29(30): 1701756. (8 pages).
Crump, "2X4 lumber for construction"—Image ID: FF06N 1, Alamy Stock Photo, Jun. 23, 2008, URL: https://www.alamy.com/stock-photo-2x4-lumber-for-construction-9527 6973 .html ?pv=1&stamp=2&imageid=A8550D42-3E6C-4728-AE23-8015E1BE2003&p=283185&n=0&orientation =0&pn =1&searchtype=0&IsFromSearch=1&srch=foo%3Dbar%26st%3D0%26. (2 pages).
Dutkova et al., "Mechanochemically synthesized CuFeSe$_2$ nanoparticles and their properties," Acta Physica Polonica A, Apr. 2017, 131(4): pp. 1156-1158. (3 pages).
Fu et al., "Nanostructured Wood Hybrids for Fire-Retardancy Prepared by Clay Impregnation into the Cell Wall," Applied Materials & Interfaces, 2017, 9: pp. 36154-36163. (10 pages).
Ghosh, S.C., "Wood modification with functionalized polydimethylsiloxanes," Dissertation, University of Gottingen, 2009, pp. 1-15. (16 pages).
Goncalves et al., "The effect of carbonization on wood structure of Dalbergia Violacea, Stryphnodendron Polyphyllum, Tapirira Guianensis, Vochysia Tucanorum, and Poutcria Torta from the Brazilian Cerrado," IA WA Journal, International Association of Wood Anatomist, Jan. 2012, 33(1): pp. 73-90. (18 pages).
Heil, M., "A Battery Made of Wood?," UMD Right Now [online], Jun. 2013 [retrieved on May 20, 2018]. Retrieved from the Internet: <URL: https://umdrightnow.umd.edu/news/battery-made-wood>. (3 pages).
Inagaki et al., Chapter 14—Carbon Materials for Spilled-oil Recovery, "Advanced Materials Science and Engineering of Carbon," Butterworth-Heinemann, 2014, pp. 313-334, available online at: http://sciencedirect.com/science/article/pii/B9780124077898000144. (22 pages).
Jakes et al., "Wood as inspiration for new stimuli-responsive structures and materials," Bioinspiration, Biomimetics, and Bioreplication, International Society for Optics and Photonics, Mar. 2014, 9055:90550K. (13 pages).
Jia et al., "Scalable, anisotropic transparent paper directly from wood for light management in solar cells," Nano Energy, 2017, 36: pp. 366-373. (8 pages).
Lee et al., "Wearable textile battery rechargeable by solar energy," Nano Letters, Oct. 2013, 13(11): pp. 5753-5761. (9 pages).
Li et al., "Lignin-Retaining Transparent Wood," ChemSusChem, 2017, 10: pp. 3445-3451. (7 pages).
Li et al., "Luminescent Transparent Wood," Advanced Optical Materials, 2016, 5:1600834. (5 pages).
Li et al., "Optically transparent wood from a nanoporous cellulosic template: Combining functional and structural performance," Biomacromolecules, Mar. 2016, 17(4): pp. 1358-1364. (7 pages).
Li et al., "Towards centimeter thick transparent wood through interface manipulation," Journal of Materials Chemistry A, 2018, 6: 1094-1101. (8 pages).
Liu et al. "Wood-graphene oxide composite for highly efficient solar steam generation and desalination," ACS Applied Materials & Interfaces, Feb. 2017, 9: pp. 7675-7681. (7 pages).
Lv et al., "Eco-friendly wood-based solid-state flexible supercapacitors from wood transverse section slice and reduced graphene oxide," Electronic Materials Letters, Jul. 2015, 11(4): pp. 633-642. (10 pages).
LV et al., "Novel wood-based all-solid-state flexible supercapacitors fabricated with a natural porous wood slice and polypyrrole," RSC Adv., 2015, 5: pp. 2813-2818. (6 pages).
Office Action, dated Jan. 30, 2022 (Jan. 30, 2022), in Chinese Application No. 201880073116.4. (24 pages).
Palaeos Plants: Glossary R-Se, Palaeos, last accessed Apr. 18, 2022, URL: http://palaeos.com/plants/glossary/glossary R.html. (5 pages).
Rekola, J., "Wood as a Model Material for Medical Biomaterials," Dissertation, Institute of Dentistry, Biomaterials Science and Department of Otorhinolaryngology and Head and Neck Surgery, University of Turku, Turku, Finland, 2011. (94 pages).
Shams et al., "Compressive deformation of wood impregnated with low molecular weight phenol formaldehyde (PF) resin III: effects of sodium chlorite treatment," J. Wood Sci, 2005, 51: pp. 234-238. (5 pages).
Soil Fertility Project—Namibia, "'Hydrophilic or Hydrophobic?'—That is the Question!," Feb. 11, 2016, available online at: http://www.soilfertilityproject.com/project.com/progress/2016/2/11/hydrophilic-or-hydrophobic-that-is-the-question. (3 pages).
Tampieri et al., "From wood to bone: multi-step process to convert wood hierarchical structures into biomimetic hydroxyapatite scaffolds for bone tissue engineering," Journal of Materials Chemistry, Jun. 2009, 19(28): pp. 4973-4980. (8 pages).
Xue et al., "Robust and Low-Cost Flame-Treated Wood for High-Performance Solar Steam Generation," ACS Applied Materials and Interfaces, Apr. 2017, 9(17), pp. 15052-15057. (6 pages).
Yang et al. "Functionalized graphene enables highly efficient solar thermal steam generation," ACS Nano, 2017, 11(6): pp. 5510-5518. (9 pages).
Yu et al., "Transparent wood containing $Cs_xWO_3$ nanoparticles for heat-shielding window applications," Journal of Materials Chemistry A, 2017, 5: pp. 6019-6024. (6 pages).
Zarrinmehr et al., "Interlocked archimedean spirals for conversion of planar rigid panels into locally flexible panels with stiffness control," Computers & Graphics, 2017, 66: pp. 93-102. (10 pages).

(56) References Cited

OTHER PUBLICATIONS

Zhang et al., "High-capacity, low-tortuosity, and channel-guided lithium metal anode," *Proceedings of the National Academy of Sciences*, Mar. 2017, 114(14): pp. 3584-3559. (6 pages).
Office Action, dated Jun. 28, 2022 (Jun. 28, 2022), in Japanese Patent Application No. 2020-515691. (7 pages).

\* cited by examiner

DELIGNIFIED WOOD MATERIALS, AND METHODS FOR FABRICATING AND USE THEREOF

CROSS-REFERENCE TO RELATED APPLICATIONS

The present application claims the benefit of U.S. Provisional Application Nos. 62/559,147, filed Sep. 15, 2017, and 62/725,810, filed Aug. 31, 2018, which are hereby incorporated by reference herein in their entireties.

FIELD

The present disclosure relates generally to materials formed from natural wood, and more particularly, to wood materials that have substantially all of the lignin removed therefrom (i.e., delignified), as well as structures and devices incorporating such delignified wood materials.

SUMMARY

Embodiments of the disclosed subject matter provide a wood material formed by removing substantially all of the lignin from natural wood. The resulting delignified wood retains cellulose-based lumina of the natural wood, with nanofibers of the cellulose microfibrils being substantially aligned along a common direction. The unique microstructure and composition of the delignified wood can provide advantageous thermal and mechanical properties, among other advantages described herein.

The delignified wood can be further processed to tailor the properties of the wood material to a particular application. For example, in thermally insulating applications, the delignified wood may be subject to freeze-drying or critical point drying so as to maintain a substantially porous nature of the cellulose microstructures, which may further enhance the insulating properties of delignified wood.

In other applications, for example where thermal transfer may be desirable, the delignified wood can be pressed such that lumina collapse (i.e., densified). As a result, the cell walls forming the lumina become entangled and hydrogen bonds are formed between adjacent nanofibers. In addition to a higher thermal conductivity, the resulting densified, delignified wood may have increased strength and toughness, as well as exhibiting improvements in other mechanical properties.

In some embodiments, it may be desirable to partially press the delignified wood, such that lumina only partially collapse, so as to tailor the resulting thermal and mechanical properties to a particular application, for example, to provide a balance of improved thermal insulation and improved strength.

By further modifying, manipulating, or machining the resulting wood material (whether delignified, densified and delignified, or partially-densified and delignified), it can be adapted to various applications. Such applications include, but are not limited to, electronic devices; insulation; radiative cooling; and building, packaging or structural materials.

In one or more embodiments, a structure comprises a first piece of natural wood that has been chemically treated to remove lignin therein while substantially preserving a structure of cellulose-based lumina of the natural wood. At least 90% of the lignin in the natural wood has been removed by the chemical treatment.

In one or more embodiments, a structure is formed by removing at least 90% of lignin from a piece of natural wood while substantially retaining cellulose-based lumina.

In one or more embodiments, a structure is formed by removing at least 90% of lignin from a piece of natural wood while substantially retaining cellulose-based lumina, and then pressing such that the lumina at least partially collapse.

In one or more embodiments, a method comprises removing at least 90% of lignin from a piece of natural wood while substantially retaining cellulose-based lumina of the natural wood, thereby producing a piece of delignified wood.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

DETAILED DESCRIPTION

Figure 1:
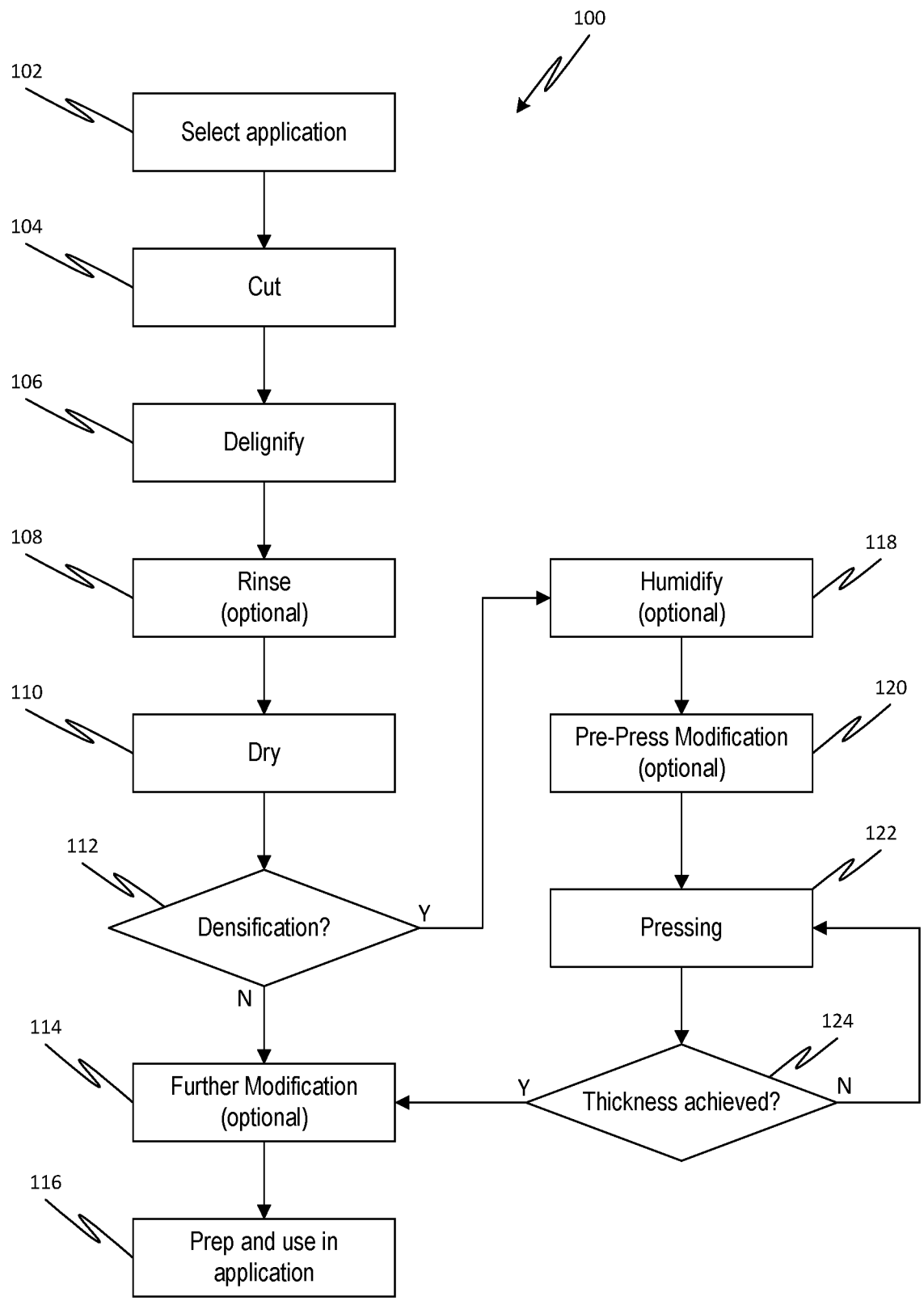
FIG. 1 is an exemplary process flow diagram for fabrication and use of delignified wood-based materials, according to one or more embodiments of the disclosed subject matter

Natural wood is a composite of cellulose nanofibers embedded in a matrix of lignin (20 wt %~35 wt %) and hemicellulose (20 wt %~30 wt %). Cellulose, the major component in wood (40 wt %~50 wt %), has a specific modulus and a specific strength higher than most metals, composites, and many ceramics. Natural wood also has a unique three-dimensional porous structure with multiple channels, including vessels and fibril tracheid lumina (e.g., tubular channels of 20-80 µm in cross-sectional dimension) extending in a direction of wood growth. Cell walls in the natural wood are mainly composed of the cellulose, hemicellulose, and lignin, with the three components intertwining with each other to form a strong and rigid wall structure.

In embodiments of the disclosed subject matter, substantially all of the lignin in the natural wood is removed to form a piece of delignified wood. As used herein "delignified" or "delignification" refers to removing substantially all of the lignin from the natural wood, and "removing substantially all of the lignin" means that at least 90% of the lignin that naturally exits in the wood has been removed. For example, the weight percentage (wt %) of lignin may be reduced from over 20 wt % (e.g., 23.4 wt %) in natural wood to less than 5 wt % in the delignified wood, and preferably less than 1 wt % (e.g., ≤0.6 wt %). Concurrent with the lignin removal, some or substantially all of the hemicellulose may also be removed. Table 1 below provides illustrative values for the chemical composition and density of natural wood (e.g., American basswood) and delignified wood.

TABLE 1

Comparison of composition for natural wood and delignified wood

|  | Cellulose | Hemicellulose | Lignin | Density |
|---|---|---|---|---|
| Natural Wood | 41.3 wt % | 16.9 wt % | 21.8 wt % | 0.47 g/cm$^3$ |
| Delignified Wood | 33.4 wt % | 6.5 wt % | 0.6 wt % | 0.13 g/cm$^3$ |

The resulting delignified wood material is more porous and less rigid than the original natural wood. The delignified wood also exhibits unique thermal properties, in particular, a very low thermal conductivity and anisotropic thermal conductivity, that enable the delignified wood material to function as an excellent thermal insulator. Conventional thermal insulators are typically isotropic, which may hinder effective thermal management. In contrast, the anisotropy of the thermal conductivity in the delignified wood materials can provide efficient thermal dissipation along the axial direction, thereby preventing local overheating on the illuminated side of the delignified wood while improving the thermal insulation along the backside.

Moreover, the delignified wood exhibits unique optical properties. In particular, the removal of lignin changes the color of the wood material to be substantially white. The delignified wood has a low emissivity (e.g., <5%) over the solar spectrum, with the ability to effectively reflect solar thermal energy. Due to its unique composition of mostly cellulose, the delignified wood can also exhibit a higher emissivity in the infrared range, in particular, within the atmospheric transmission window (i.e., between 8 µm and 13 µm, inclusive), where electromagnetic energy can propagate without distortion or absorption. As a result, the delignified wood can radiate heat energy to space via the atmospheric window to provide passive cooling (or active cooling, when coupled with additional components to effect heat transfer).

The resulting delignified wood material is lightweight yet strong due to the effective bonding between the aligned cellulose nanofibrils. However, in some applications, it may be desirable to have substantially greater strength and/or improved thermal conductivity. For example, in passive cooling applications, it may be desirable to have more heat transfer through the wood. Thus, in embodiments, the delignified wood can be subject to densification to improve mechanical properties and thermal conductivity. As used herein, "densification" refers to the process of pressing the delignified wood in a direction crossing a direction of extension of the lumina (i.e., a wood growth direction) of the wood, such that the lumina mostly or fully collapse (e.g., such that the thickness of the wood is reduced by ~80%).

As noted above, the delignification process removes substantially all of the lignin and at least some of the hemicellulose from the cells walls of the natural wood, leading to an all-cellulose microstructure with numerous aligned cellulose nanofibers. The densification then collapses most of the microchannels in the delignified wood, resulting in a dense, laminated structure with compactly stacked and intertwined layers of aligned cellulose nanofibers. The hierarchically aligned and laminated microstructure, with hydrogen bonding between nanofibers, significantly improves the tensile strength and toughness of the resulting densified, delignified wood material. The nanopores and ultra-high whiteness imparted by the delignification process provide excellent thermal insulating properties despite the compact, laminated structure, but higher thermal conductivity than the original delignified wood. Table 2 below provides illustrative values for the different properties offered by natural wood (e.g., American basswood), delignified wood, and densified, delignified wood.

TABLE 2

Values for different properties offered by wood preparations

| Wood | Density (g/cm$^3$) | % of original thickness | Specific Strength (MPa-cm$^3$/g) | Thermal conductivity (W/m-K) | |
|---|---|---|---|---|---|
|  |  |  |  | Axial | Transverse |
| Natural | 0.3-0.6 | 100% | ~120 | 0.468 | 0.156 |
| Delignified | 0.13 | ~100% | ~138 | 0.06 | 0.032 |
| Densified, Delignified | 1.21 | ~20% | ~330 | 1.82 | 0.168 |

In some applications, it may be desirable to have a balance of strength and insulating properties. For example, to provide insulation in structural or building applications, it may be desirable to have improved strength from the densification process while retaining the lower thermal conductivity of the structure immediately after delignification. Thus, in embodiments, the delignified wood can be subject to partial densification to improve mechanical properties and thermal conductivity. As used herein, "partial densification" refers to the process of pressing the delignified wood in a direction crossing a direction of extension of the lumina (i.e., the wood growth direction) of the wood, such that the lumina only partially collapse (e.g., such that the thickness of the wood is reduced by 50% or less). The partial-densified, delignified wood materials may thus provide a mix of insulating and mechanical strength features.

Accordingly, in embodiments, the thermal and mechanical properties of the resulting delignified wood can be tailored to a particular application by varying the amount of pressing during densification, from no pressing at all (0% reduction in thickness and thus higher porosity) to full pressing (where all channels have fully collapsed and thus lower porosity, around ≥80% reduction in thickness). For example, unpressed delignified wood may be suitable for high insulating applications with minimal strength requirements, such as where the wood material will be supported between other higher strength components. For example, the densified, delignified wood may be suitable for passive cooling applications, where the wood material forms a part of a building structure, such as a roof, wall, or siding. For example, the partially-densified, delignified wood may be suitable for insulating applications with higher strength requirements, such as where the wood material will directly form a part of a building structure, such as roof, wall, or siding.

Moreover, additional materials can be added to the delignified wood, before pressing or after pressing, in order to form a hybrid structure. The added materials can add functionality not otherwise available with the natural wood, for example, by providing hydrophobicity or fire resistance, while enjoying the improved thermal and/or mechanical performance offered by delignified wood, densified, delignified wood, or partially-densified, delignified wood. Thus, embodiments of the disclosed subject matter can be adapted to a wide variety of applications.

Referring initially to FIG. 1, a generalized process 100 for forming and using delignified wood is shown. The process 100 can begin at 102, where a particular application is selected for the delignified wood. As noted above, the thermal and mechanical properties of the final wood material can be tailored based on the desired application, and thus the fabrication method will depend on the ultimate use of the wood material.

Figure 2A:
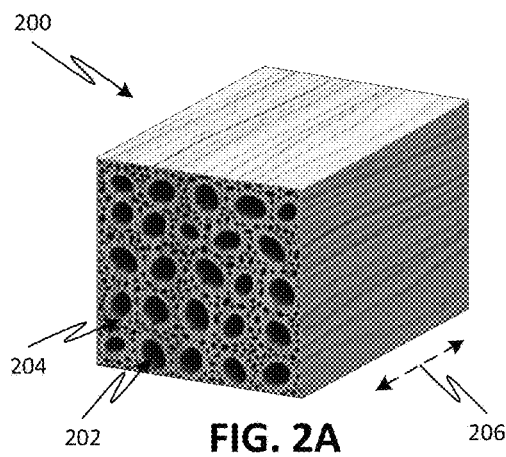
FIG. 2A is a simplified illustration of a piece of natural wood prior to any lignin removal.

The process 100 can proceed to 104, where a piece of natural wood is supplied, for example, by cutting from an existing tree (or other plant) or block of natural wood. For example, FIG. 2A illustrates a piece of natural wood 200 that has been cut to a rectangular shape, although other starting shapes are also possible, such as but not limited to, cylindrical or hollow cylindrical shapes. The natural wood 200 exhibits a unique three-dimensional structure with lumina 202 that extend along a tree growth direction 206. The lumina 202 are bounded by cell walls 204.

Figure 2B:
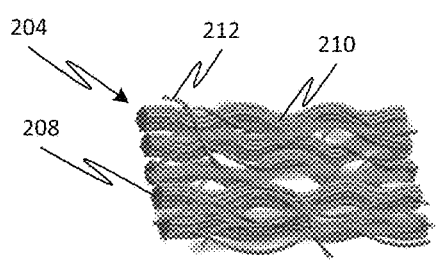
FIG. 2B is a simplified illustration of cellulose fibrils within the natural wood prior to any lignin removal.
Figure 2C:
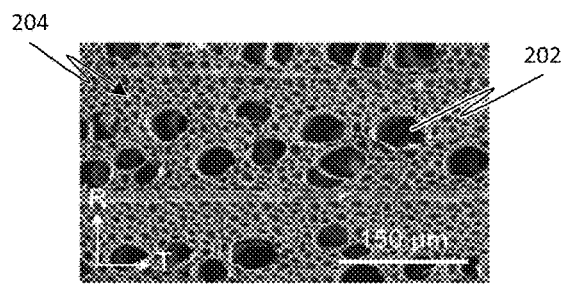
FIG. 2C is a scanning electron microscopy (SEM) image of a top surface, in a direction perpendicular to a tree growth direction, of the natural wood prior to any lignin removal.
Figure 3C:
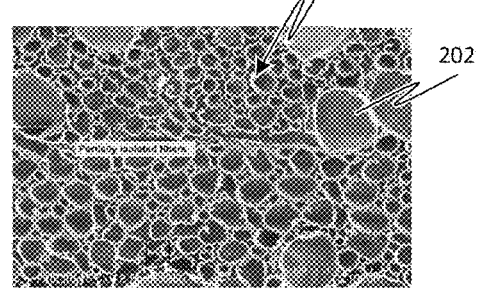
FIG. 3C is an SEM image of a top surface, in a direction perpendicular to the tree growth direction, of the wood after delignification, according to one or more embodiments of the disclosed subject matter.
Figure 2D:
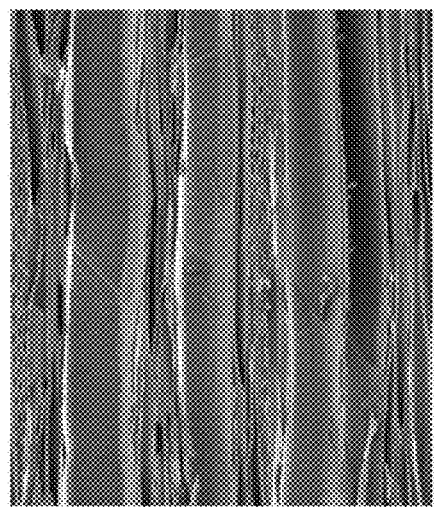
FIG. 2D is an SEM image of a longitudinal section, in a direction parallel to a tree growth direction, of the natural wood prior to any lignin removal.
Figure 3D:
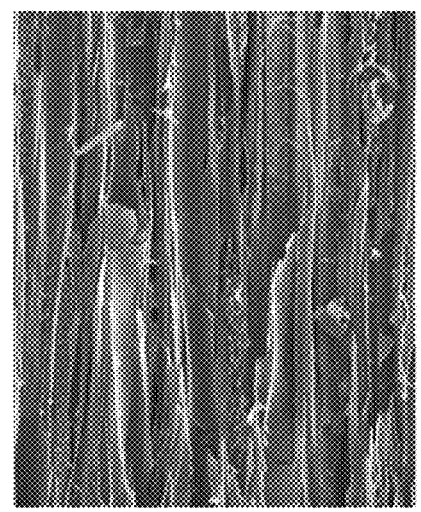
FIG. 3D is an SEM image of a longitudinal section, in a direction parallel to the tree growth direction, of the wood after delignification, according to one or more embodiments of the disclosed subject matter.
Figure 2E:
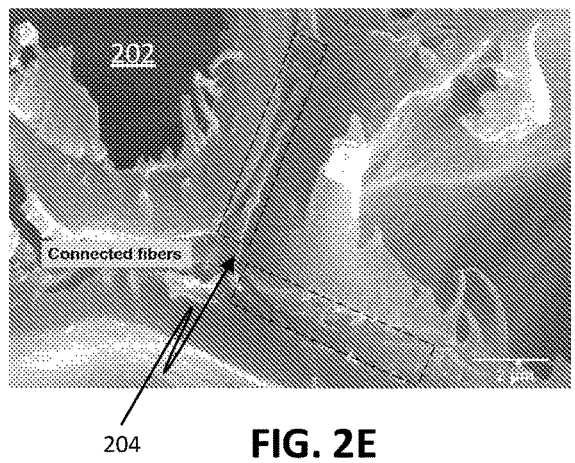
FIG. 2E is an SEM image of a close-up of cellulose fibrils in the natural wood prior to any lignin removal.

Within wood cell walls 204, the three major components, i.e., the paracrystalline cellulose microfibril aggregates or bundles 208, amorphous heteropolysaccharide hemicellulose 210 and polyphenolpropane-based branched lignin 212, intertwine with each other, as shown in FIG. 2B, to form a strong and functional vascular structure to transport water, ions, and nutrients from roots to the leaves during photosynthesis. FIGS. 2C-2E are scanning electron microscopy (SEM) images showing the morphology and microstructure of the natural wood 200.

The natural wood can be any type of hard wood or softwood, such as, but not limited to, basswood, oak, poplar, ash, alder, aspen, balsa wood, beech, birch, cherry, butternut, chestnut, cocobolo, elm, hickory, maple, oak, padauk, plum, walnut, willow, yellow poplar, bald cypress, cedar, cypress, douglas fir, fir, hemlock, larch, pine, redwood, spruce, tamarack, juniper and yew. In some embodiments, the natural wood can be a naturally occurring fibrous plant other than a tree, such as bamboo.

After the cutting 104, the process 100 proceeds to 106 where the piece of natural wood 200 can be subjected to a treatment with a chemical solution in order to remove substantially all of the lignin therefrom. The chemical solution can include chemicals used in pulping or pulp bleaching and can include at least one of $NaOH$, $NaOH/Na_2S$, $NaHSO_3+SO_2+H_2O$, $NaHSO_3$, $NaHSO_3+Na_2SO_3$, $NaOH+Na_2SO_3$, $Na_2SO_3$, $NaOH+AQ$, $NaOH/Na_2S+AQ$, $NaHSO_3+SO_2+H_2O+AQ$, $NaOH+Na_2SO_3+AQ$, $NaHSO_3+AQ$, $NaHSO_3+Na_2SO_3+AQ$, $Na_2SO_3+AQ$, $NaOH+Na_2S+Na_2S_n$, $Na_2SO_3+NaOH+CH_3OH+AQ$, $CH_3OH$, $C_2H_5OH$, $C_2H_5OH+NaOH$, $C_4H_9OH$, $HCOOH$, $CH_3COOH$, $CH_3OH+HCOOH$, $C_4H_8O_2$, $NH_3.H_2O$, p-TsOH, $H_2O_2$, $NaClO$, $NaClO_2$+acetic acid, $ClO_2$, and $Cl_2$, where n in an integer and AQ is Anthraquinone.

The treatment 106 can be performed under vacuum, so as to encourage the chemical solution to fully penetrate the cell walls and lumina of the natural wood. In some embodiments the treatment 106 can be a single step chemical treatment, e.g., a single exposure to a single chemical or mixture of chemicals (e.g., a bath of $H_2O_2$). Alternatively, the treatment 106 can be a multi-step chemical treatment, e.g., a first exposure to a first chemical or mixture (e.g., a bath of NaOH and $Na_2SO_3$) followed by a second exposure to a second chemical or mixture (e.g., a bath of $H_2O_2$).

As a result of the delignification 106, the natural wood that had a yellow color turns completely white, and exhibits a change in weight percentage, for example, from 100% to 57%. In particular, the treatment can be such that at least 90% (weight percent) of lignin previously in the original natural wood is removed, while otherwise substantially retaining the cellulose-based microstructure of the natural wood. For example, the wood after the treatment may have less than 5 wt %, and preferably less than 1 wt %, e.g., 0.6 wt %, of lignin. As illustrated schematically in FIGS. 3A-3B, the resulting delignified wood has a cell wall microstructure 304 with increased porosity and better nanofibril alignment due to the removal of non-alignment lignin and/or self-alignment in the wet processing state.

Once sufficient lignin has been removed by the treatment of 106, the process 100 can proceed to optionally rinsing the treated piece of wood. The rinsing can include immersing the treated piece of wood in a solvent, such as, but not limited to, ethanol and/or de-ionized (DI) water. In some embodiments, the solvent may be at an elevated temperature, such as boiling. The rinsing can be effective to remove any remnants of the chemical solution within the treated piece of wood and/or any components of the wood dislodged by the treatment.

After rinsing 108 (or after conclusion of treatment 106 when there is no rinsing), the process 100 can proceed to 110, where the delignified wood is subject to a drying step. The drying may be dependent on the final application of the wood. For example, where the delignified wood is to be used without pressing for a particular insulating application, the wood may be subjected to a drying process that preserves the nanoporous and open lumen structure, such as by freeze-drying or critical point drying. Alternatively, where the delignified is to be used after pressing, the wood may be subjected to drying in air.

Figure 3A:
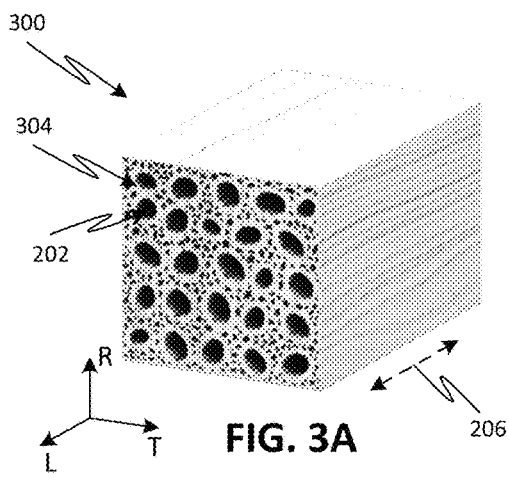
FIG. 3A is a simplified illustration of a piece of wood after delignification, according to one or more embodiments of the disclosed subject matter.
Figure 3B:
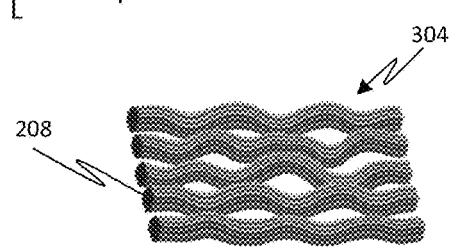
FIG. 3B is a simplified illustration of cellulose fibrils within the wood after delignification, according to one or more embodiments of the disclosed subject matter.

After drying 110, the process 100 can proceed to 112, where it is determined if pressing for densification or partial-densification is desired. If no pressing is desired, the process can proceed to optional further modification 114 (described below) or can be prepared for use in a particular application 116. The final delignified wood material 300 can thus have a porous structure with cellulose nanofibers aligned along a direction of extension 206 of the lumina 202, as illustrated in FIGS. 3A-3B.

FIGS. 3C-3I show various SEM images of an exemplary delignified wood material 300 after freeze-drying. Wood cell walls in the natural wood 200 are originally composed of primary and secondary cell walls, with the latter being further divided into three layers. The cells are bonded with each other through a middle lamella, as illustrated in FIG. 2E. Among the cell wall layers, the middle layer in the secondary cell wall is the thickest and composed of parallel cellulose nanofibril aggregates aligned within a small angle difference along the length axis 206. The fibril angle (FA) of this middle layer varies by ~10-15° and can help define the alignment of the cell wall. Due to the natural alignment of the fibrils in the wood, the individual cellulose nanofibrils that constitute the cell walls 304 are packed and aligned parallel to each other, leading to the hierarchical alignment in the delignified wood. Each fibril aggregate is composed of aligned crystalline cellulose nanofibrils with high-aspect ratios (i.e., a diameter of ~30 nm and a length of >~1 µm) that are packed with glucan chains in a crystalline order and held together by intermolecular hydrogen bonds and van der Waals forces.

Figure 3E:
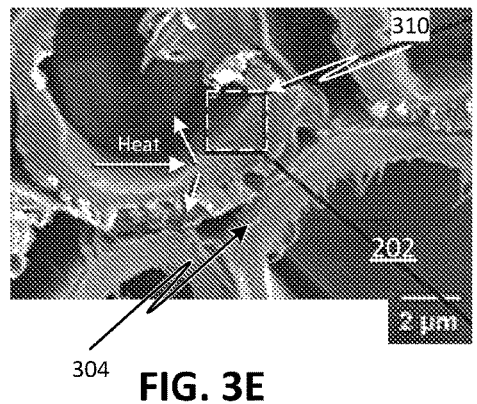
FIG. 3E is a magnified SEM image of region 310 of FIG. 3D, according to one or more embodiments of the disclosed subject matter.
Figure 3F:
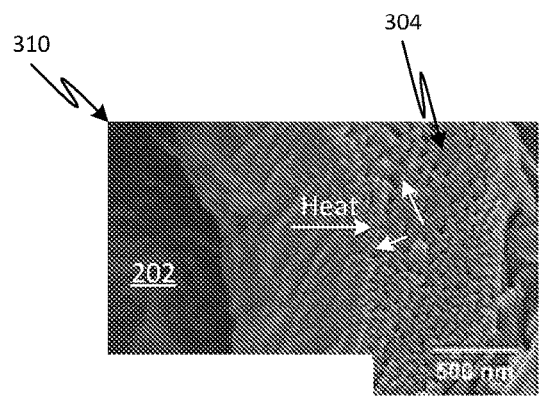
FIGS. 3F-3G are magnified and further magnified SEM images, respectively, of cellulose fibrils of the wood after delignification, according to one or more embodiments of the disclosed subject matter.
Figure 3G:
Figure 3H:
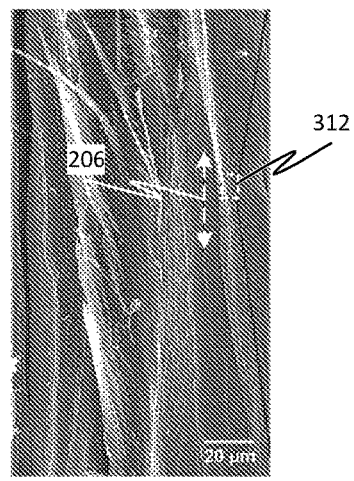
FIG. 3H is an SEM image of aligned channels in a cross-section of the wood after delignification, according to one or more embodiments of the disclosed subject matter.
Figure 3I:
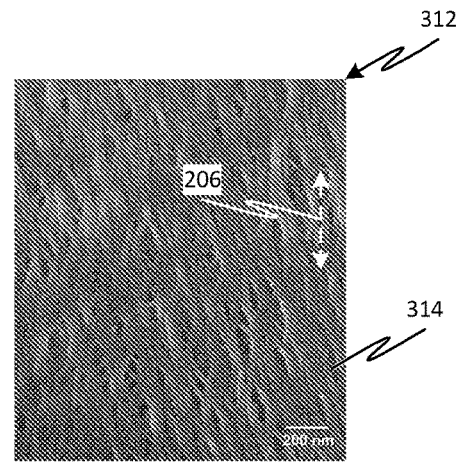
FIG. 3I is a magnified SEM image of region 312 in FIG. 3H.

After the delignification, the cellulose nanofibril aggregates in the cell wall layer can be directly observed in the fibril cross section, as shown in FIGS. 3E-3G. The fibril walls 304 are isolated from each other due to removal of the main part of the lignin-rich middle lamella and the lignin in the primary and secondary wall cell wall. The removal of lignin and hemicellulose not only separates the fibril aggregates from each other but also increases the porosity of the fibril wall structure 304, provided that the delignified fibrils are dried in a careful way to avoid a collapse of the fibril wall. Thus, the three-dimensional (3D) microporous structure of the natural wood can be well preserved, but with more porous cell walls due to the removal of lignin and hemicellulose components, as illustrated in FIGS. 3H-3I.

Returning to FIG. 1, if pressing is desired at 112, the process 100 can optionally proceed to 118, where the delignified wood is subjected to humidification prior to pressing. The humidification may help the delignified wood from breaking during the pressing. For example, the humidification can include subjecting the delignified wood to an elevated relative humidity (e.g., 90% relative humidity) for an extended period of time (e.g., 0.5-24 hours, such as 12 hours). In some embodiments, the humidification step may be omitted, for example, where only minimal pressing is desired or where the delignified wood otherwise retains sufficient moisture after the drying process 110.

After the humidification 118, the process 100 can optionally proceed to 120, where the delignified wood is subjected to a pre-pressing modification. For example, the optional modification 120 can include forming or depositing non-native particles on surfaces of the delignified wood. Such surfaces can include internal surfaces, e.g., cell walls lining the lumina, as well as external surfaces of the delignified wood. The non-native particles incorporated onto the surfaces of the delignified wood can imbue the ultimate densified wood with certain advantageous properties, such as hydrophobicity, weatherability, corrosion resistance (e.g., salt water resistant), and/or flame resistance among other properties. For example, in an embodiment, hydrophobic nanoparticles (e.g., $SiO_2$ nanoparticles) can be formed on surfaces of the delignified wood.

Alternatively or additionally, the optional modification 120 can include adding a polymer to the delignified wood or performing a further chemical treatment that modifies surfaces of the chemically treated wood to obtain the advantageous properties. For example, the further chemical treatment of 120 to provide hydrophobic properties can include at least one of epoxy resin, silicone oil, polyurethane, paraffin emulsion, acetic anhydride, octadecyltrichloro silane (OTS), 1H, 1H, 2H, 2H-perfluorodecyltriethoxysilane, fluoroesin, polydimethylsiloxane (PDMS), methacryloxymethyltrimethyl-silane (MSi), polyhedral oligomeric silsesquioxane (POSS), potassium methyl siliconate (PMS), dodecyl(trimethoxy) silane (DTMS), hexamethyldisiloxane, dimethyl diethoxy silane, tetraethoxysilane, methyltrichlorosilane, ethyltrimethoxysilane, methyl triethoxysilane, rim-ethylchlorosilane, phenyltrimethoxysilane, phenyltriethoxysilane, propyltrimethoxysilane, polymethyl methacrylate, polydiallyldimethylammonium chloride (polyDADMAC), 3-(trimethoxysilyl)propyl methacrylate (MPS, hydrophobic stearic acid, amphiphilic fluorinated triblock azide copolymers, polyvinylidene fluoride and fluorinated silane, n-dodecyltrimethoxysilane, and sodium lauryl sulfate.

In an exemplary embodiment, the pre-press modification 120 includes applying a hydrophobic coating to the delignified wood. For example, the delignified wood can be immersed in 2% 1H,1H,2H,2H-Perfluorooctyltriethoxysilane/ethanol solution for 24 hours before pressing. The fluoro-silane groups are chemically bonded to the wood channels, thus providing a stable surface modification and restricting the effect of moisture and water on the wood. Different than a coating method, the solution penetrates the mesoporous wood structure and converts the hydrophilic —OH groups of cellulose into hydrophobic functional groups (i.e., perflourinated hydrocarbon chains). The fluoro-silane treatment can introduce a hydrophobicity such that the final densified, delignified wood material exhibits a static contact angle of at least 90° or a dynamic contact angle less than 10°. In some embodiments, the final wood material may exhibit superhydrophobicity (i.e., having a static water contact angle of 150° or greater) as a result of the fluoro-silane treatment.

Alternatively or additionally, the pre-press modification 120 can include at least one of cupramate (CDDC), ammoniacal copper quaternary (ACQ), chromated copper arsenate (CCA), ammoniacal copper zinc arsenate (ACZA), copper naphthenate, acid copper chromate, copper citrate, copper azole, copper 8-hydroxyquinolinate, pentachlorophenol, zinc naphthenate, copper naphthenate, kreosote, titanium dioxide, propiconazole, tebuconazole, cyproconazole, boric acid, borax, organic iodide (IPBC), and $Na_2B_8O_{13} \cdot 4H_2O$, in order to provide weatherability or corrosion resistance.

Although modification 120 is shown as occurring after the humidification 118, it is also possible for modification 120 to occur before or concurrent with humidification 118, according to one or more contemplated embodiments. The process 100 can then proceed to 122, where the delignified wood is pressed in a direction crossing a direction in which the lumina extend. For example, the pressing 122 can be in a direction substantially perpendicular to the direction in which the lumina extend, or the pressing 122 may be at another angle but have a force component perpendicular to the direction in which the lumina extend. The pressing 122 can reduce a thickness of the wood, thereby increasing its density, as well as removing any voids or gaps within the cross-section of the wood. For example, the pressing 122 can be at a pressure between 0.5 MPa and 10 MPa, e.g., 5 MPa. In some embodiments the pressing may be performed at room temperature (i.e., cold pressing), while in other embodiments the pressing may be performed at an elevated temperature (i.e., hot pressing). For example, the pressing may be performed at a temperature between 20° C. and 120° C., e.g., 60-80° C.

During the pressing 122, hydrogen bonds can form between the remaining cellulose-based nanofibers of the cell walls of the delignified wood, thereby improving mechanical properties of the wood. Moreover, any particles or materials formed on surfaces of the wood or within the wood during modification 120 can be retained after the pressing, with the particles/materials on internal surfaces being embedded within the collapsed lumina and intertwined cell walls. The pressing 122 can be performed for a period of time that allows desirable hydrogen bonds to form. For example, the delignified wood can be held under pressure for a time period of at least 5 minutes, although other times are possible depending on factors such as temperature, relative humidity, and type of wood. For example, the delignified wood can be held under pressure for at least 1 hour, at least 12 hours, at least 24 hours, or at least 48 hours. The pressing may result in a relatively low surface roughness, for example, of 10 nm or less (arithmetic average surface roughness).

Figure 5A:
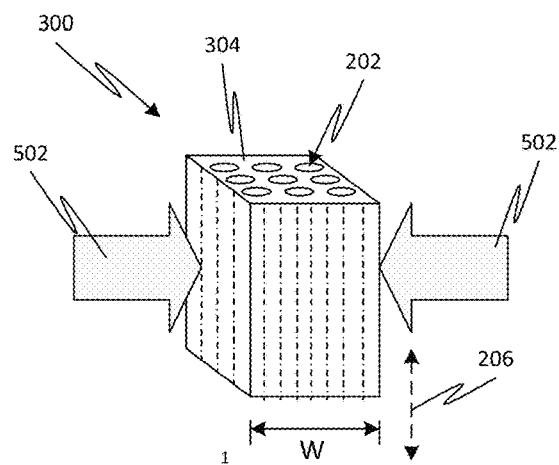
FIG. 5A is a simplified illustration of delignified wood subject to densification, according to one or more embodiments of the disclosed subject matter.
Figure 5B:
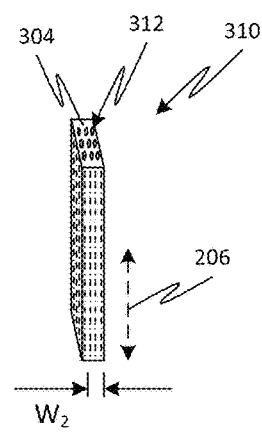
FIG. 5B is a simplified illustration of densified, delignified wood, according to one or more embodiments of the disclosed subject matter.
Figure 5C:
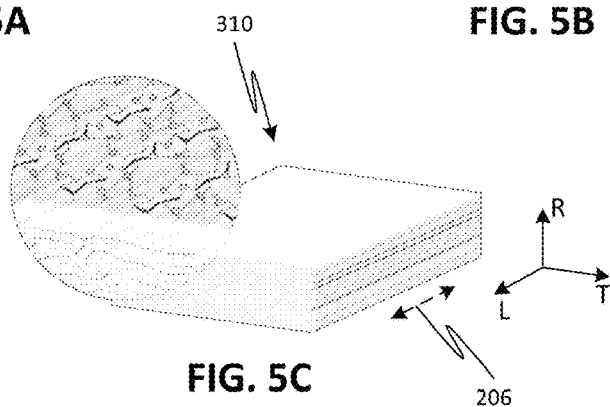
FIG. 5C is an isometric illustration of densified, delignified wood, with the inset illustrating a close-up view of the wood and chemical makeup of the wood surface, according to one or more embodiments of the disclosed subject matter.
Figure 5D:
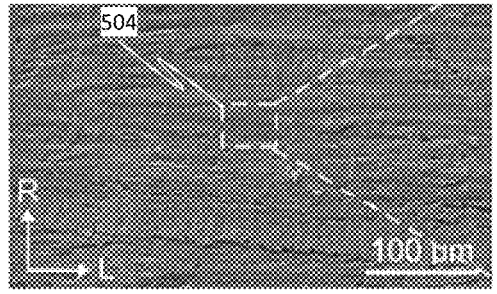
FIG. 5D is an SEM image, taken in the R-L plane, of densified, delignified wood, according to one or more embodiments of the disclosed subject matter.
Figure 5E:
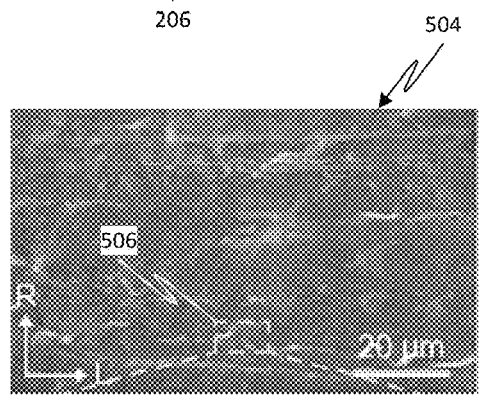
FIG. 5E is a magnified SEM image of region 504 in FIG. 5D.
Figure 5F:
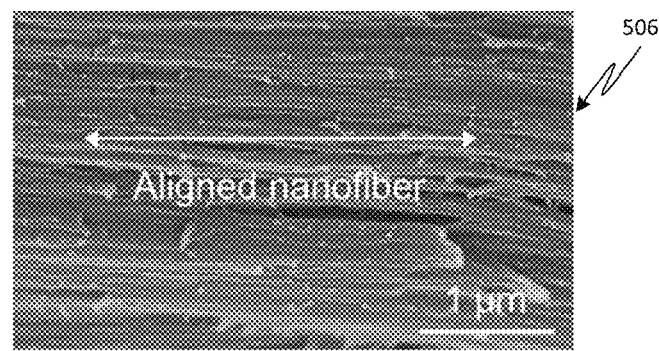
FIG. 5F is a magnified SEM image of region 506 in FIG. 5E.

FIG. 5A illustrates a delignified wood block 300 with lumina 202 extending along direction 206 and walls 304 comprised of cellulose-based nanofibers aligned along direction 206. The block 300 can be subjected to pressing 502 in a direction crossing the extension direction 206, thereby resulting in the densified, delignified wood structure 310 of FIGS. 5B-5C. As a result of the pressing, the lumina 302 can fully collapse, as indicated at 312, and the cell walls 304 can become intertwined. The pressing can be such that a thickness $W_2$ of the block 310 after pressing is reduced between 0% and 100% as compared to $W_1$ of the block 300. For example, the thickness $W_2$ may be reduced by greater than 50%, 75%, or 80%, as compared to $W_1$ of the block 300.

The SEM images of FIGS. 5C-5F show the morphology and microstructure of an exemplary densified, delignified wood material. As is evident from FIGS. 5D-5E, the space between channels of natural wood completely vanished upon densification, while tightly stacked laminated layers can be found along the tree-growth direction (i.e., 206 or L). At the higher magnification of FIG. 5F, highly aligned cellulose nanofibers can be observed, suggesting that densification does not damage cellulose nanofiber alignment.

As noted above, the pressing may be designed to only partially collapse the lumina (i.e., partial-densification), to provide a desired mix of thermal and mechanical properties. Thus, at 124 in FIG. 1, it is determined if sufficient pressing has been performed based on the application selected in 102. If a smaller thickness is desired, the process may return to 122 to continue the pressing until the desired thickness (and corresponding densification) has been achieved. Once the desired thickness has been achieved, the process can proceed via 124 to optional modification 114.

Figure 6A:
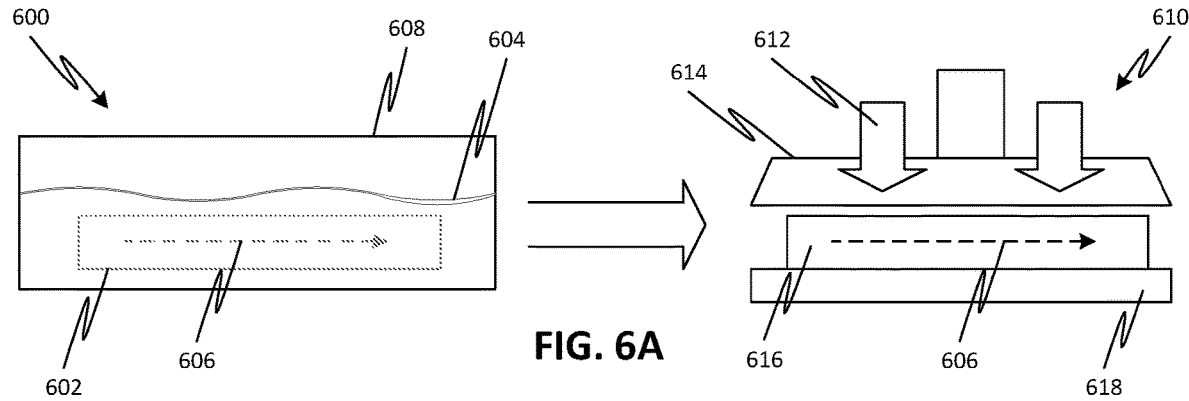
FIG. 6A is a simplified schematic illustration of an exemplary process for forming densified, delignified wood, according to one or more embodiments of the disclosed subject matter.

The delignification 106 and/or densification 122 can be accomplished in a variety of manufacturing setups. Referring now to FIG. 6A, an exemplary fabrication process for forming a densified, delignified wood material from natural wood 602 is shown. The natural wood 602 may be in the form of a sheet, stick, strip, bar, block, membrane, film, or any other shape of wood. Lumina within the natural wood 602 can extend along wood-growth direction 606. The first step 600 in the fabrication process can be immersing the natural wood 602 within a chemical solution 604, for example, as described above with respect to 106 of process 100, to remove substantially all of the lignin from the wood 602. The chemical solution 604, and the wood 602 immersed therein, may be contained within a housing 608. In some embodiments, the housing 608 may be a vacuum housing and may maintain the solution 604 and wood 602 under vacuum during the immersion. Alternatively or additionally, the housing 608 or another component therein can heat the solution 604 to a temperature above room temperature. For example, the solution 604 may be heated to boiling during the chemical treatment 600.

After the treatment 600, the delignified wood 616 may be conveyed from housing 608 to a compression station 610 for pressing in a direction substantially perpendicular to, or at least crossing, the direction of extension 606, for example, as described above with respect to 122 of process 100. For example, the compression station 610 can include an upper platen 614 and a lower platen 618. Relative motion between the platens 614, 618 results in the desired compression of delignified wood 616 to produce the densified, delignified wood. For example, upper platen 614 may move toward lower platen 618, which remains stationary and supports the wood 616 thereon, in order to impart a compression force 612 to the wood 616. Alternatively, both platens 614 and 618 may move toward each other to impart the compression force 612.

In some embodiments, during the compression, one or both platens 614, 618 can be heated so as to raise a temperature of the wood 616 above room temperature. Alternatively or additionally, the platens 614, 618 may be unheated but a separate heating mechanism may be provided or an environment containing the compression station may be heated in order to raise a temperature of the wood 616.

Figure 6B:
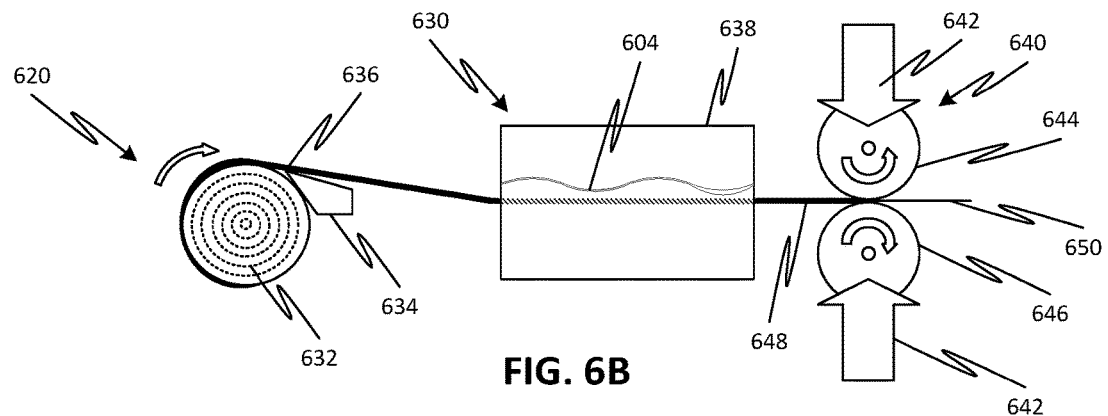
FIG. 6B is a simplified schematic illustration of an exemplary process for forming densified, delignified wood using rotary cutting, according to one or more embodiments of the disclosed subject matter.

Referring to FIG. 6B, another exemplary fabrication process for forming a densified, delignified wood material from natural wood 632 is shown. The natural wood 632 may be in the form of a log or cylindrical bar, with lumina extending in a direction perpendicular to the page. The first step 620 can be cutting the natural wood 632 using, for example, a rotary lathe 634 to separate a thin continuous layer 636 of natural wood for subsequent processing. The natural wood layer 636 can be conveyed to housing 638 for the next step 630 in the fabrication process, e.g., immersing the wood 636 within a chemical solution 604, for example, as described above with respect to 106 of process 100, to remove substantially all of the lignin from the wood layer 636.

Similar to housing 608, housing 638 may be configured to apply a vacuum and/or heat during the immersion. In some embodiments, the size of the housing 638 and the speed of conveyance of the layer 636 from the natural wood 632 and through the housing 638 may correspond to the desired immersion time for the chemical treatment. Thus, a time from when a portion of the layer 636 enters housing 638 to when it leaves housing 638 for the compression station 640 would correspond to the immersion time necessary for substantially complete lignin removal.

After the treatment 630, the delignified wood 648 may be conveyed from housing 638 to compression station 640, for pressing in a direction substantially perpendicular to, or at least crossing, the direction of extension, for example, as described above with respect to 122 of process 100. For example, the compression station 640 can include an upper roller 644 and a lower roller 646, which may remain at a fixed distance from each other. The fixed distance may be less than a thickness of the chemically treated wood 648, thereby applying a pressing force 642 that results in the densified wood.

In some embodiments, during the compression, one or both rollers 644, 646 can be heated so as to raise a temperature of the wood 648 above room temperature. Alternatively or additionally, the rollers 644, 646 may be unheated but a separate heating mechanism may be provided, or an environment containing the compression station 640 may be heated, in order to raise a temperature of the wood 648.

Although only two rollers 644, 646 are shown in FIG. 6B, multiple rollers may be disposed in series along a direction of conveyance of the sheet 648. The sheet 648 can be maintained under pressure as it is conveyed between adjacent rollers, in order to provide a desired cumulative time of compression (e.g., on the order of minutes or hours). Alternatively or additionally, the size of the rollers 644, 646 and the speed of conveyance of the sheet 648 may correspond to the desired compression time. Thus, a time from when the sheet 648 is first compressed to when it exits the compression station 640 as the densified, delignified wood 650 would correspond to the desired pressing time. Of course, it also possible to decouple the compression station 640 from the chemical treatment 638, for example, by cutting the sheet 636 prior to or after chemical treatment 638. In such configurations, the compression station may take the form of rollers as illustrated in FIG. 6B or as flat platens as illustrated in FIG. 6A.

Figure 6C:
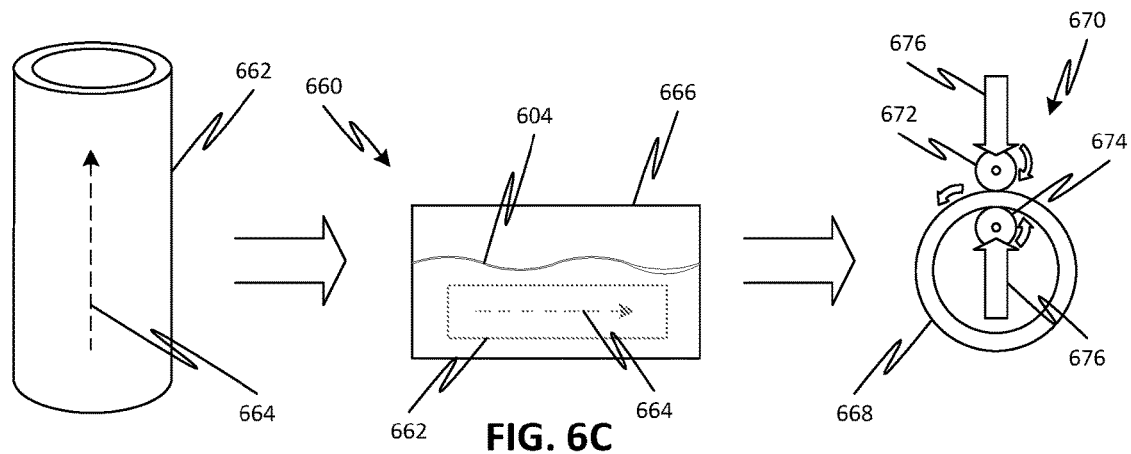
FIG. 6C is a simplified schematic illustration of an exemplary process for forming densified, delignified wood from a hollow cylinder of natural wood, according to one or more embodiments of the disclosed subject matter.

Referring to FIG. 6C, an exemplary fabrication process for forming a densified, delignified wood material from natural wood 662 is shown. The natural wood 662 may be in the form of a hollow cylinder, with lumina extending along wood-growth direction 664. The first step 660 in the fabrication process can be immersing the natural wood 662 within a chemical solution 604, for example, as described above with respect to 106 of process 100, to remove substantially all of the lignin from the wood 662. The chemical solution 604, and the wood 662 immersed therein, may be contained within a housing 666, which may be configured to apply a vacuum and/or heat during the immersion similar to housing 608 of FIG. 6A.

After the treatment 660, the delignified wood cylinder 668 may be conveyed from housing 666 to a compression station 670 for pressing in a direction substantially perpendicular to, or at least crossing, the direction of extension 664 (which is perpendicular to the plane of the page at 670 in FIG. 6C), for example, as described above with respect to 122 of process 100. For example, the compression station 670 can include an upper roller 672 disposed on an exterior of the cylinder 668 and a lower roller 674 disposed within an interior of the cylinder 668. The rollers 672, 674 may remain at a fixed distance from each other as the wall of the cylinder 668 passes therethrough. The fixed distance may be less than a wall thickness of the chemically treated wood 668, thereby applying a pressing force 676 that results in a hollow cylinder of densified wood.

In some embodiments, during the compression, one or both rollers 672, 674 can be heated so as to raise a temperature of the wood 668 above room temperature. Alternatively or additionally, the rollers 672, 674 may be unheated but a separate heating mechanism may be provided, or an environment containing the compression station 670 may be heated, in order to raise a temperature of the wood 668.

Although only two rollers 672, 674 are shown in FIG. 6C, multiple rollers may be disposed in series around the circumference of the cylinder 668. The wall of the cylinder 668 can be maintained under pressure as it is conveyed between adjacent rollers, in order to provide a desired cumulative time of compression (e.g., on the order of minutes or hours). Alternatively or additionally, the size of the rollers 672, 674 and the speed of rotation of the cylinder 668 may correspond to the desired compression time.

Figure 6D:
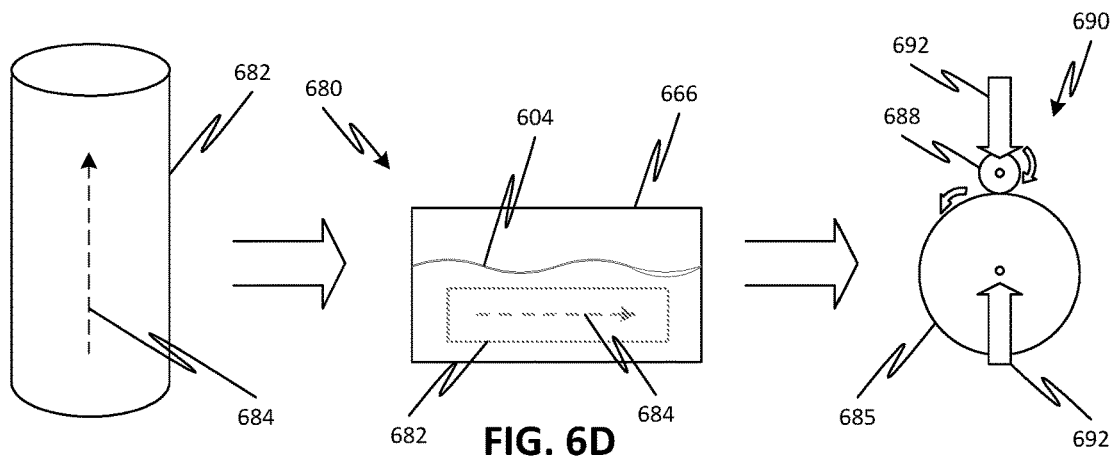
FIG. 6D is a simplified schematic illustration of an exemplary process for forming densified, delignified wood from a solid cylinder of natural wood, according to one or more embodiments of the disclosed subject matter.

Referring to FIG. 6D, an exemplary fabrication process for forming a densified, delignified wood material from natural wood 682 is shown. The natural wood 682 may be in the form of a solid cylinder, with lumina extending along wood-growth direction 684. The first step 680 in the fabrication process can be immersing the natural wood 682 within a chemical solution 604, for example, as described above with respect to 106 of process 100, to remove substantially all of the lignin from the wood 682. The chemical solution 604, and the wood 682 immersed therein, may be contained within a housing 666, which may be configured to apply a vacuum and/or heat during the immersion similar to housing 608 of FIG. 6A.

After the treatment 680, the delignified wood cylinder 685 may be conveyed from housing 666 to a compression station 690 for pressing in a direction substantially perpendicular to, or at least crossing, the direction of extension 684 (which is perpendicular to the plane of the page at 690 in FIG. 6D), for example, as described above with respect to 122 of process 100. For example, the compression station 690 can include a single roller 688 disposed on an exterior of the cylinder 685, which can be supported and rotatable around a central axis thereof. The roller 688 may remain at a fixed distance that presses into the wall of the cylinder 685 as it rotates past, thereby applying a pressing force 692 that results in a solid cylinder of densified, delignified wood.

In some embodiments, during the compression, the roller 688 can be heated so as to raise a temperature of the wood 685 above room temperature. Alternatively or additionally, the roller 688 may be unheated but a separate heating mechanism may be provided, or an environment containing the compression station 690 may be heated, in order to raise a temperature of the wood 886.

Figure 6E:
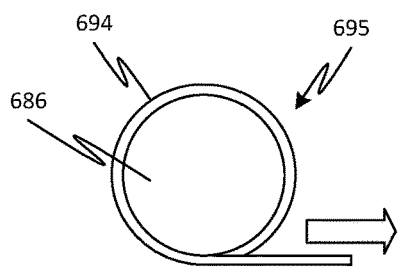
FIG. 6E is a simplified schematic illustration of another exemplary process for forming densified, delignified wood from a solid cylinder of natural wood, according to one or more embodiments of the disclosed subject matter.

Although only a single roller 688 is shown in FIG. 6D, multiple rollers may be disposed in series around the circumference of the cylinder 685. The cylinder 685 can be maintained under pressure as it is conveyed between adjacent rollers, in order to provide a desired cumulative time of compression (e.g., on the order of minutes or hours). Alternatively or additionally, the size of the roller 688 and the speed of rotation of the cylinder 685 may correspond to the desired compression time. In yet another alternative, the cylinder 686 may be pressed by a compression belt 694 of compression station 695, as illustrated in FIG. 6E, instead of compression station 690 with roller 688. In such a configuration, the cylinder 686 may remain static rather than being rotated.

Although FIGS. 6A-6E illustrate a single chemical treatment step, in some embodiments multiple chemical treatments are applied to achieve the delignification. In embodiments where the delignification comprises a multi-step chemical process, the solution 604 within housing 608 may be exchanged for the subsequent treatment solution while maintaining the wood 602 therein, or the wood 602 may be moved to a different housing (not shown) or a different part of housing 608 containing the next treatment solution in the sequence.

Although particular wood shapes and fabrication techniques have been illustrated in FIGS. 6A-6E, other shapes (whether solid or hollow) and fabrication techniques are also possible according to one or more contemplated embodiments. Accordingly, the wood shapes and fabrication techniques are not limited to those specifically illustrated. Moreover, although rinsing stations, drying stations, humidification stations, and pre-pressing and post-pressing modifications have not been specifically illustrated, the techniques of FIGS. 6A-6E can be readily adapted to include rinsing, drying, humidification, pre-pressing modification and/or post-pressing modification, according to one or more embodiments of the disclosed subject matter.

Returning to FIG. 1, after pressing 122, or when densification is not required at 112, the process 100 optionally proceeds to 114, where a further modification can be performed. For example, the optional modification 114 can include forming or depositing a coating (e.g., of non-native particles) on exterior surfaces of the delignified wood. The coating can imbue the delignified wood with certain advantageous properties, such as hydrophobicity, weatherability, corrosion resistance (e.g., salt water resistant), color, and/or flame resistance among other properties. For example, the coating can comprise oil-based paint, hydrophobic paint, polymer coating, or fire-resistant coating.

Alternatively or additionally, the coating of modification 114 can include at least one of boron nitride (BN), montmorillonite clay, hydrotalcite, silicon dioxide ($SiO_2$), sodium silicate, calcium carbonate ($CaCO_3$), aluminum hydroxide ($Al(OH)_3$), magnesium hydroxide ($Mg(OH)_2$), magnesium carbonate ($MgCO_3$), aluminum sulfate, iron sulfate, zinc borate, boric acid, borax, triphenyl phosphate (TPP), melamine, polyurethane, ammonium polyphosphate, phosphate, phosphite ester, ammonium phosphate, ammonium sulfate, phosphonate, diammonium phosphate (DAP), ammonium dihydrogen phosphate, monoammonium phosphate (MAP), guanylurea phosphate (GUP), guanidine dihydrogen phosphate, and antimony pentoxide. In an embodiment, a fire-resistant coating of nanoparticles (e.g., BN nanoparticles) can be formed on exterior surfaces of the densified wood. Alternatively or additionally, the further modification 114 can include dyeing the otherwise white-color delignified wood. For example, the dye can be methylene blue.

After the optional modification 114, the process 100 can optionally proceed to 116, where the delignified wood can be prepared for an eventual use, for example, by machining or manipulating to alter a structure or shape of the delignified wood. Machining processes can include, but are not limited to, cutting (e.g., sawing), drilling, woodturning, tapping, boring, carving, routing, sanding, grinding, and abrasive tumbling. Manipulating process can include, but are not limited to, bending, molding, and other shaping techniques.

After the optional machining or manipulation of 116, the delignified wood can be used in a particular application. Because of its unique combination of thermal, optical, and mechanical properties, the delignified wood can find application in a wide variety of structures and uses. For example, the delignified wood can be adapted for use as:

- an exterior component (e.g., body panel, door panel, roof, bumper, flooring, roof, trim, mast, etc.), an internal structural component (e.g., chassis, frame rails, crossbeam, fuselage frame, wing frame, etc.), or an interior component (e.g., door panel, liner, handle, railing, flooring, seat, trim, storage bin or shelf, etc.) of an automobile, truck, motorcycle, train, aircraft, watercraft, spacecraft, ship or any other transport, vehicle, or conveyance;
- an exterior component (e.g., external wall, siding, roofing, shutters, etc.), an internal structural component (e.g., frame, studs, wall plates, lintels, crossbeams, load bearing beam, underfloor, etc.), or an interior component (e.g., door, door frame, window frame, picture frame, wall, flooring, paneling, ceiling, trim, stairs, railing, etc.) of a home, office, barn factory, warehouse, tower, or any other building or structure;
- a structural component of a deck, awning, dock, patio, bridge, pole, bleachers, or platform;
- furniture (e.g., chair, bench, desk, table, cabinet, wardrobe, countertop, etc.) or internal structural components thereof (e.g., frame for sofa or chair, bedframe, etc.), or home accent or decoration;
- musical instrument (e.g., piano, guitar, violin, harp, zither, drum, etc.), sports equipment (e.g., golf clubs, table tennis table and paddle, basketball backboard, goal or goalpost, baseball bat, etc.), tool (e.g., hammer handle, broom handle, sawhorse, etc.); or
- protective component (e.g., computer case, cell phone case, blast shield, protective vest, etc.), enclosure, container, box, shipping crate, packaging, or housing.

The above list is not intended to be exhaustive. Uses of the delignified wood beyond those specifically listed are also possible according to one or more contemplated embodiments. Indeed, one of ordinary skill in the art will readily appreciate that the delignified wood can be adapted to other applications based on the teachings of the present disclosure.

Figure 4A:
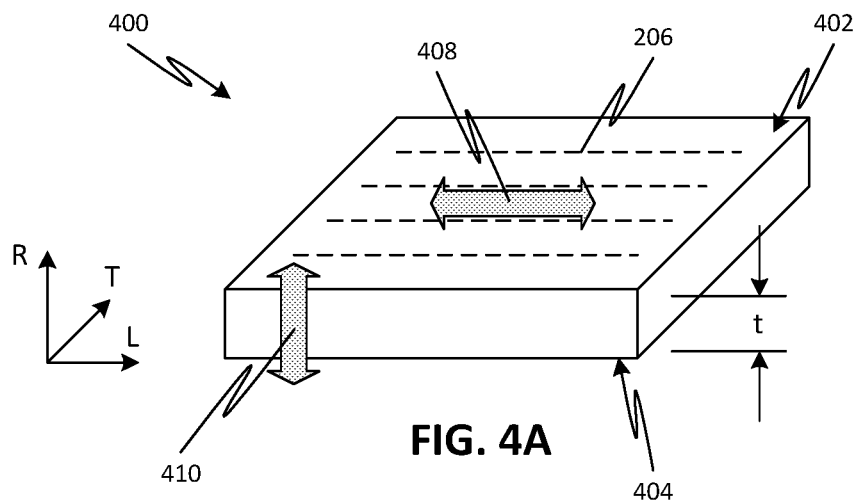
FIG. 4A is a simplified illustration of delignified wood with anisotropic thermal conductivity, according to one or more embodiments of the disclosed subject matter.

As noted above, the delignified wood can exhibit anisotropic thermal properties that can be used to advantage in insulating applications. For example, FIG. 4A illustrates an exemplary delignified wood block 400, where the wood has been cut such that top surface 402 and bottom surface 404 are substantially parallel to a direction 206 of extension of the wood lumina (i.e., parallel to a tree growth direction L). Because of the porous cell walls and the open lumina of the delignified wood, the thermal conductivity 410 in the transverse/radial direction (i.e., perpendicular to the cellulose nanofibril alignment direction 206) is substantially reduced as compared to the natural wood. For example, the delignified wood 400 can have a transverse thermal conductivity 410 of ~0.03 W/m-K, while the natural wood had a transverse thermal conductivity of ~0.156 W/m-K. At the same time, the nanofibrils act to conduct heat along their axes, albeit at a reduced rate as compared to the natural wood due the presence of nanopores in the cell walls. Thus, the delignified wood exhibits an anisotropic thermal conductivity, with the axial thermal conductivity 408 (i.e., parallel to the cellulose nanofibril alignment direction 206) being greater than the radial thermal conductivity 410. In some embodiments, the axial thermal conductivity 408 is at least two times greater than the transverse thermal conductivity 410. For example, the delignified wood 400 can have an axial thermal conductivity of ~0.06 W/m-K, while the natural wood had an axial thermal conductivity of ~0.47 W/m-K. Such anisotropy can allow heat to spread along the nanofibril direction 206, which prevents local failure due to accumulated thermal energy and reduces the heat flow in the transverse direction R.

The delignified wood 400 is composed of long, aligned fibril aggregates with large surface-to-volume ratio and high aspect ratio. Since the delignification removes substantially all of the lignin and much of the hemicellulose, the fibril walls are more porous than the natural wood. This results in a lower compressive strength of the delignified wood, in the thickness direction of the nanofibrils, as compared to the natural wood. For example, the maximum compressive stress along the axial direction 206 for the delignified wood 400 can be ~13 MPa. However due to the orientation of the fibrils in the fibril wall, i.e., in a twist along the fibril axis 206, the delignified samples have a significant strength in the thickness direction of the fibrils and a more significant strength in the length direction of the fibrils. The properties in tension and compression are thus affected in a different way due to the difference in breakage mechanisms for the loading situations.

Figure 4B:
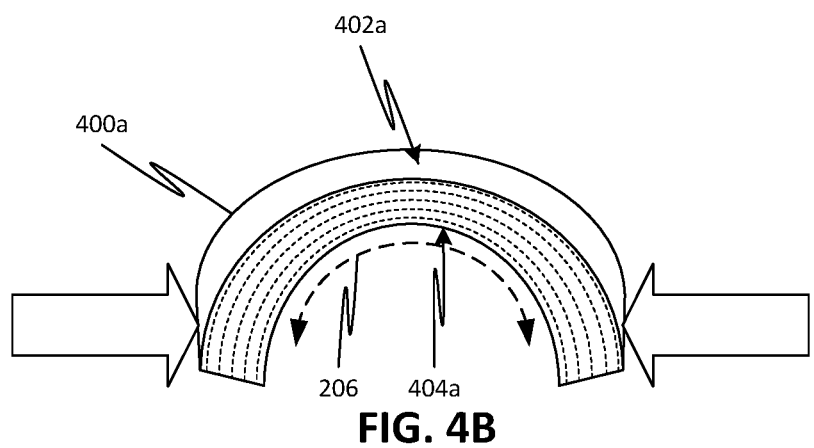
FIG. 4B is a simplified illustration of delignified wood in a state of bending, according to one or more embodiments of the disclosed subject matter.
Figure 4C:
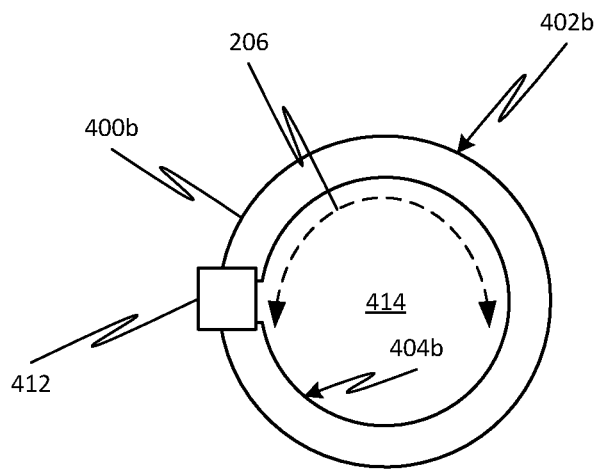
FIG. 4C is a simplified illustration of delignified wood bent to form a conduit, according to one or more embodiments of the disclosed subject matter.

The nanofiber structure of the delignified wood 400 also improves the flexibility as compared to the natural wood. Thus, the delignified wood 400a can be bent without damage, as shown in FIG. 4B, where the direction of extension 206 of the lumina follows the curved top surface 402a and bottom surface 404a. In addition, when the thickness, t, of the delignified wood 400 is less than ~1 mm, the block 400 may be capable of being rolled or folded into a structure. For example, as illustrated in FIG. 4C, the delignified wood 400b can be rolled into a tube or conduit, where one surface 402b forms the exterior of the conduit and an opposite surface 404b delineates an interior volume 414 of the conduit. A joint 412 may couple opposing ends of the delignified wood 400b to seal the interior volume 414 from the exterior of the conduit.

Figure 7A:
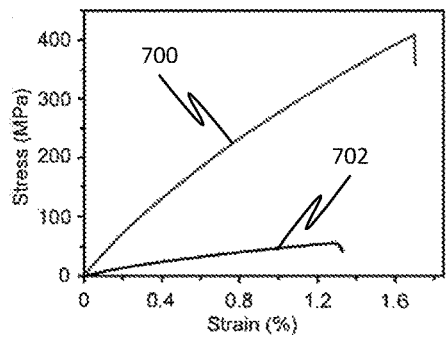
FIG. 7A is a graph of stress versus strain for natural wood and densified, delignified wood, according to one or more embodiments of the disclosed subject matter.

In contrast, the densification of the delignified wood can yield significantly improved mechanical properties as compared to the natural wood. In particular, the densified, delignified wood is mechanically stronger and tougher than natural wood due to the larger interaction area between exposed hydroxyl groups of the aligned cellulose nanofibers in the growth direction 206 after lignin removal. The densified, delignified wood 700 demonstrates a tensile strength as high as 404.3 MPa±14.8 MPa, which is about ~9 times higher than natural wood 702, as illustrated in FIG. 7A. Mechanical strength per weight is an important parameter in structural applications, such as buildings. For the densified, delignified wood 700, the specific tensile strength can exceed 300 MPa-cm$^3$/g, for example, 334.2 MPa-cm$^3$/g.

Figure 7B:
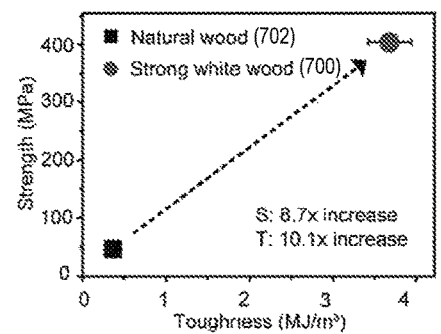
FIG. 7B is a graph of strength versus toughness for natural wood and densified, delignified wood, according to one or more embodiments of the disclosed subject matter.

In addition, a significantly improved toughness of 3.68 MJ/m$^3$ was observed for densified, delignified wood 700, which is ~10 times higher than that of natural wood 702, as shown in FIG. 7B. This can be attributed to the energy dissipation enabled by repeated hydrogen bond formation/breaking at the molecular scale in the densified, delignified wood material. Note that in conventional structural materials, strength and toughness are typically mutually exclusive. The simultaneous enhancement of strength and toughness in the densified, delignified wood material is thus desirable for structural material design, as well as other applications.

Figure 7C:
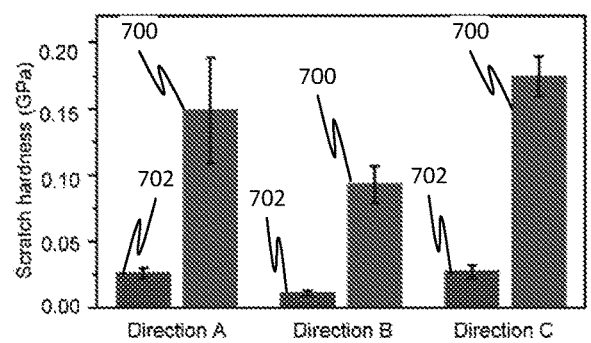
FIG. 7C is a graph of scratch hardness for natural wood and densified, delignified wood, according to one or more embodiments of the disclosed subject matter.

The densified, delignified wood 700 also shows improved scratch hardness as compared to natural wood 702, as illustrated in FIG. 7C, where direction A represents a direction parallel to the tree growth direction 206, direction B represents a direction perpendicular to the tree growth direction 206, and direction C represents an intermediate direction between A and B. As characterized by a linear reciprocating tribometer, the scratch hardness of the densified, delignified wood reaches up to 0.175 GPa in direction C. Compared with natural wood, the scratch hardness of the densified, delignified wood increased by 5.7, 6.5 and 8.4 times in directions A, B and C, respectively.

Figure 8A:
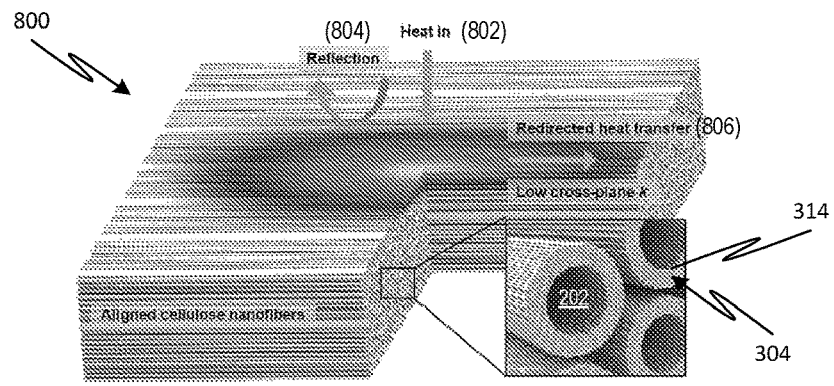
FIG. 8A is a simplified illustration of an exemplary delignified wood block used for insulation, according to one or more embodiments of the disclosed subject matter.

As noted above, the unique microstructure of the delignified wood offers anisotropic thermal properties that can be useful for insulation applications. For example, FIG. 8A shows an exemplary delignified wood material 800 used as an insulating material. The delignified wood 800 possesses four key characteristics desirable for superior thermal insulation. First, the delignification process increases the porosity of the wood (e.g., from 60% for basswood to ~91% for the delignified wood). The large porosity results in a much smaller thermal conductivity than that of the natural wood. Second, the removal of intermixed lignin and hemicellulose largely reduces the linkage among cellulose fibrils and the fibril aggregates within the fibril wall 304, leading to a much weaker interaction between fibrils and further reducing the thermal conductivity in the transverse/radial direction. Third, the aligned, high aspect ratio nanofibril 314 aggregates result in anisotropic heat flow 806 along the direction of the nanofibril alignment. Fourth, most of the void channels 202 (fibrils and vessel elements) in the delignified wood 800 are between 10-100 μm in diameter, while the individual cellulose nanofibrils 314 in the fibril aggregates in the cell walls 304 exhibit an inter-fibril aggregate spacing in the nanometer range. The spacing between aligned fibril aggregates is much smaller than the mean free path of air (~70 nm) at ambient condition, which reduces the contribution of air thermal conduction.

Figure 8B:
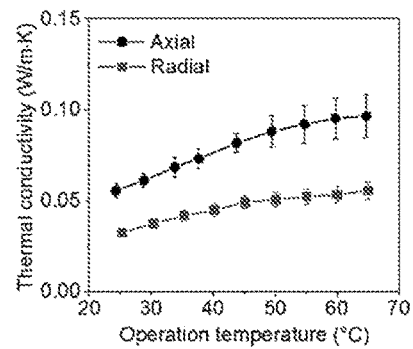
FIGS. 8B-8C are graphs of axial and transverse (radial) thermal conductivities for delignified wood, according to one or more embodiments of the disclosed subject matter, and natural wood, respectively.
Figure 8C:
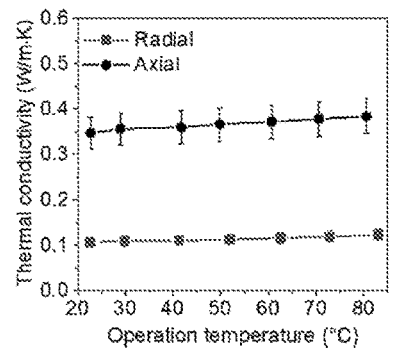

These features combine to yield an anisotropic thermal conductivity for the delignified wood 800 that is highly insulating. The thermal conductivity in the radial direction is 0.032±0.002 W/m-K at 25.3° C. and 0.056±0.004 W/m-K at 24.3° C. in the axial direction, as illustrated in FIG. 8B. In contrast, the natural wood (American basswood) exhibits a thermal conductivity of 0.107±0.011 W/m-K in the radial direction and 0.347±0.035 W/m-K in the axial direction at 22.7° C., as illustrated in FIG. 8C. The thermal conductivity in the natural wood stays almost constant from room temperature to 80° C. However, for the delignified wood, the thermal conductivity in the transverse direction slowly rises from 0.03 to 0.055 W/m-K at higher operating temperatures, whereas in the axial direction, the value slowly changes from 0.056 to 0.10 W/m-K.

Figure 8D:
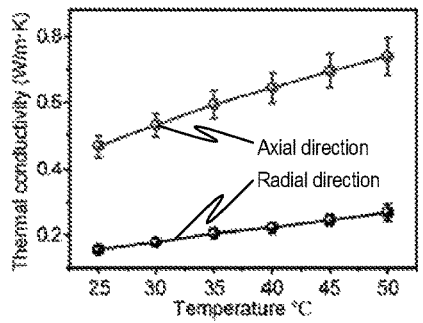
FIGS. 8D-8E are graphs of axial and transverse (radial) thermal conductivities for natural wood and densified, delignified wood, according to one or more embodiments of the disclosed subject matter, respectively.
Figure 8E:
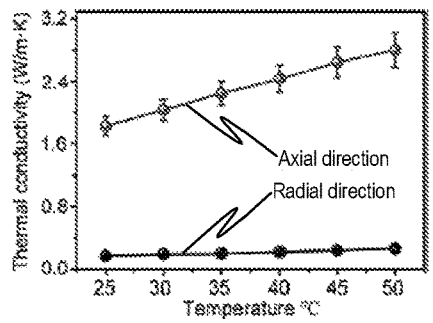

Performing densification on the delignified wood increases the thermal conductivity, which may be useful for particular applications. But the densification preserves the wood cell alignment, such that the densified, delignified wood also exhibits strong anisotropy with respect to thermal conductivity. As shown in FIG. 8E, the thermal conductivities of the densified, delignified wood along (axial) and perpendicular (radial) to the tree growth direction were measured to be 1.82 W/m-K and 0.168 W/m-K, respectively. In contrast, the natural wood (i.e., basswood, but a different batch than that of FIG. 8C) has a thermal conductivity of 0.468 W/m-K and 0.156 W/m-K in axial and radial directions, respectively, as illustrated in FIG. 8D.

Thus, the thermal conductivity of the densified, delignified wood in the transverse direction is comparable to that of the natural wood, which can be attributed to the complete removal of lignin and the numerous phonon scattering interfaces between the aligned cellulose fibers during the delignification process. Upon chemical removal of amorphous lignin and hemicellulose, the delignified wood potentially exhibits a higher crystalline quality, which contributes to a higher thermal conductivity in axial direction. Notably, when normalized by weight, the specific thermal conductivities of the densified, delignified wood in both directions are much lower than that of the natural wood. For the densified, delignified wood, a high anisotropic factor can be obtained. For example, the densified, delignified wood can have an anisotropic factor that is at least five or at least ten, for example, 10.8, which is 3.6 times higher than that of natural wood.

Figure 9A:
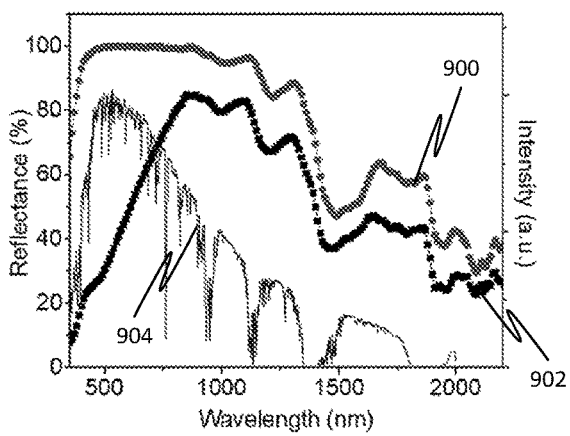
FIG. 9A is a graph of reflectance versus wavelength for natural wood and delignified wood, according to one or more embodiments of the disclosed subject matter.

The removal of substantially all of the lignin from the natural wood also yields a uniquely low emissivity, making the delignified wood highly efficient for blocking thermal solar radiation. For example, a piece of delignified wood 900 exhibited an average ~95% reflection covering from 400 nm to 1100 nm wavelength range, as shown in FIG. 9A, with the transmittance being below the basic noise level (<0.1%). The unique broadband omnidirectional reflectance of the delignified wood results from the dense nano-sized scattering centers on its surface. The emissivity was calculated to be ~5%, which indicates an effective reflection of thermal energy from the radiative heat source. In contrast, natural wood 902 absorbed an average of 50% of the light in the visible light spectrum.

Figure 9B:
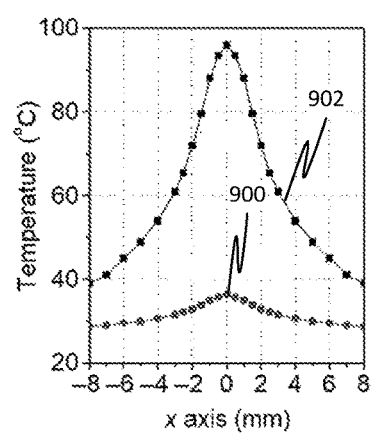
FIG. 9B is a graph of temperature profiles of natural wood and delignified wood, according to one or more embodiments of the disclosed subject matter, when subjected to point illumination by a laser.

To further test the reflection features of delignified wood 900, a collimated 820 nm laser source with a spot size of 1 mm and an input power of 0.95 W/mm$^2$ was directed at the surface of delignified wood and natural wood specimens. As shown in FIG. 9B, the maximum temperature of the delignified wood was 36° C., while the natural wood 902 exhibited a substantially higher temperature of 99.4° C. The vast difference in thermal response between delignified wood 900 and natural wood 902 is due to the improved heat dissipation due to the anisotropic thermal conductivity as well as the lower absorption from the improved reflectance.

Figure 9C:
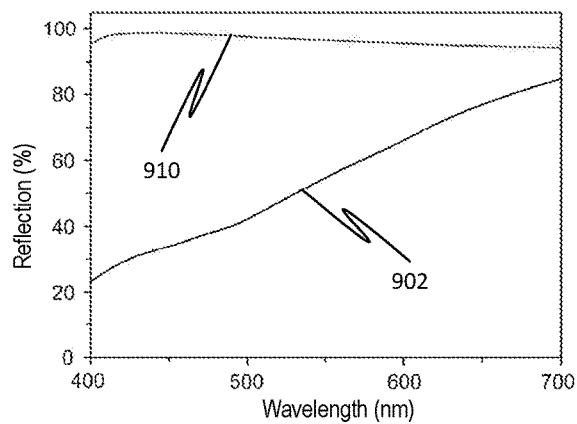
FIG. 9C is a graph of reflectance versus wavelength for natural wood and densified, delignified wood, according to one or more embodiments of the disclosed subject matter.
Figure 9D:
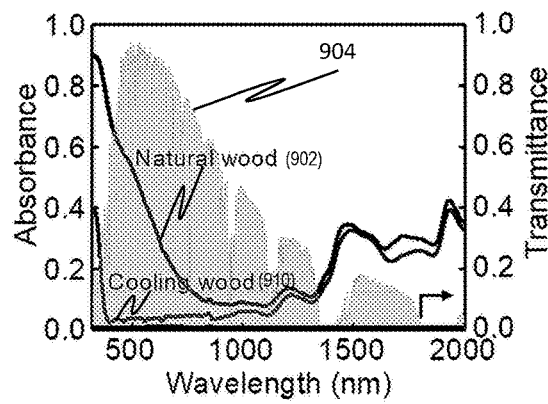
FIG. 9D is a graph of absorbance versus wavelength for natural wood and densified, delignified wood, according to one or more embodiments of the disclosed subject matter.

The densified, delignified wood exhibits similar optical properties with respect to solar radiation. For example, reflection results in the visible spectrum for a piece of densified, delignified wood 910 and a piece of natural wood 902 are shown in FIG. 9C. Both types of woods exhibit negligible transmittance (less than 0.1%). Therefore, the absorptivity spectra were derived by subtracting the reflectivity from unity (A=1−R−T), as shown in FIG. 9D. Despite the pressing, the densified, delignified wood contains some multiscale pores, as well as the cellulose nanofibers substantially aligned along the tree growth direction 206. The multiscale pores and channels function as randomized and disordered scattering elements for an intense broadband reflection at all visible wavelengths, as shown in FIG. 9C. In contrast to the use of high index particles (e.g., $TiO_2$) to achieve whiteness, which otherwise suffer from high absorption in the UV range that could increase heating due to solar radiation, the cellulose nanofibers exhibit a low refractive index of ~1.48. As a result, the reflectivity of the densified, delignified wood 910 is greater than 90% over the visible light range, and thus yields a low absorption with respect to the solar radiation spectrum 904. When the electric field of the incident light is polarized along the alignment direction of the cellulose nanofibers 206, the reflectance of the densified, delignified wood 910 further increases to ~96%, due to strong scattering by the aligned nanofibers as well as the low refractive index of cellulose.

Compared to natural wood 902, absorption of densified, delignified wood 910 in the visible wavelengths is dramatically reduced due to the complete removal of its lignin and the largely disordered cellulose-based photonic scattering centers. The integrated solar absorbance of the densified, delignified wood 910 was 8%±0.4%, resulting in ~75 $W/m^2$ solar heating under a direct light of 1000 $W/m^2$ integrated power (equivalent to the solar radiation intensity). In contrast, the natural wood 902 demonstrated an average solar absorbance of 29%±0.3%, which is nearly 200 $W/m^2$ higher than that of the densified, delignified wood 910.

The anisotropic and low thermal conductivity properties, coupled with the reflectance of radiation, can allow embodiments of the delignified wood and densified, delignified wood to act as efficient thermal insulators. For example, as illustrated in FIG. 8A, the layered structure of aligned cellulose nanofibrils of the delignified wood 800 effectively reflects 804 the incoming radiative energy 802 while redirecting the absorbed heat 806 in the planar direction, thereby minimizing (or at least reducing) the amount of heat reaching the back surface of the wood 800. Compared with an isotropic insulator, the prepared delignified wood can redirect the incoming thermal energy along the axial direction, leading to a much lower front-side and backside temperature of the wood material.

Figure 12A:
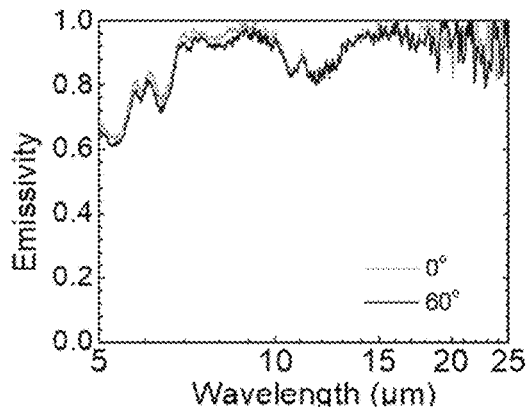
FIG. 12A is a graph of infrared emissivity for densified, delignified wood, according to one or more embodiments of the disclosed subject matter.

Due to its chemical composition, the delignified wood also preferentially emits radiation in the infrared range, which can be used in combination with the low, anisotropic thermal conductivity and high solar radiation reflectance to advantage, for example, in passive cooling applications. In particular, the emissivity spectra of the densified, delignified wood in the infrared range, from 5 μm to 25 μm (i.e., covering blackbody emission centered at room temperature) is shown in FIG. 12A. The densified delignified wood exhibits high emissivity in the infrared range (i.e., close to unity), emitting strongly at all angles and radiating a net heat flux via the atmospheric transparency window (i.e., 8 μm to 13 μm) to the cold sink of outer space in the form of infrared radiation. In other words, the densified, delignified wood can be considered "black" in the infrared range while appearing "white" in the solar spectrum.

Figure 12B:
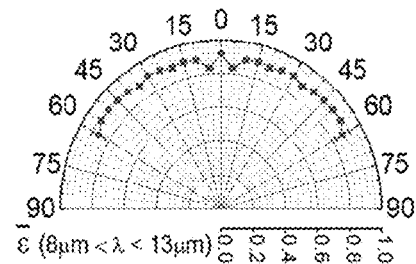
FIG. 12B is a graph of polar distribution of averaged emissivity across the atmospheric transmission window for densified, delignified wood, according to one or more embodiments of the disclosed subject matter.

As illustrated in FIGS. 12A-12B, the infrared emissivity spectrum response shows negligible angle dependence from 0-60°. The averaged emissivity across the atmospheric window is greater than 0.9 for emission angles between ±60°, indicating a stable emitted heat flux when the densified, delignified wood is aimed at different angles in relation to the sky, as it would be in practical applications. The strong emission from 8 μm to 13 μm is mainly contributed by the complex infrared emission of OH association, C—H, C—O, and C—O—C stretching vibrations between 770 $cm^{-1}$ and 1250 $cm^{-1}$. The cellulose in the delignified wood exhibits the strongest infrared absorbance by OH and C—O centered at 1050 $cm^{-1}$ (9 μm), which coincidently lies in the atmospheric transparency window. The high emissivity across the rest of the infrared spectrum results in radiative heat exchange between the densified, delignified wood and the atmosphere, such as in the second atmospheric window between 16-25 μm, which further increases the overall radiative cooling flux when the surface temperature is close to that of the ambient.

Figure 11:
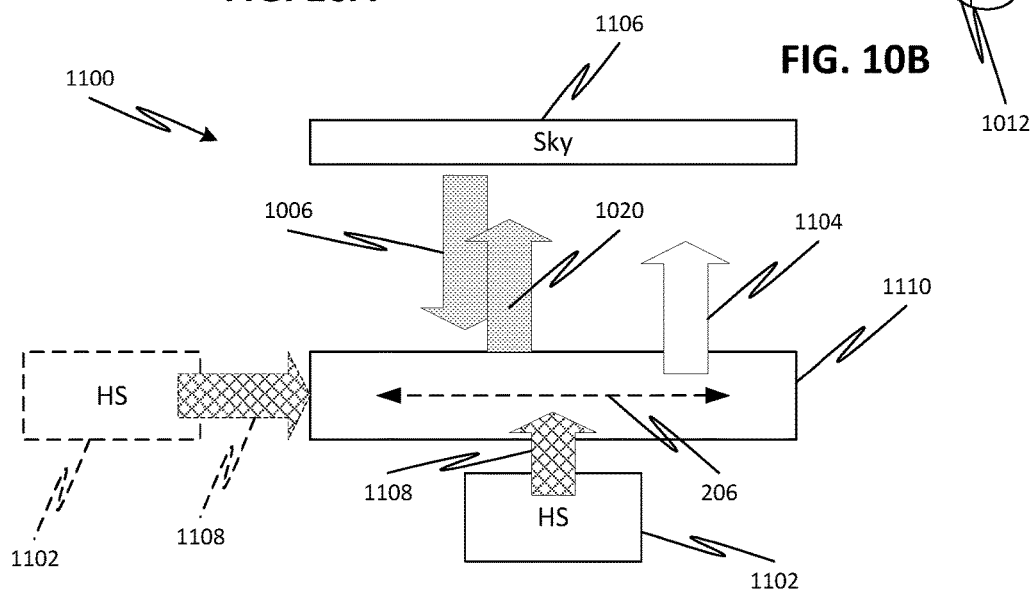
FIG. 11 is a simplified illustration of a cooling setup using delignified wood, according to one or more embodiments of the disclosed subject matter.

Thus, the densified, delignified wood is capable of simultaneously low solar absorption, high reflection of solar radiation, and good emission in the infrared range. Applications can take advantage of these simultaneous properties, for example, to provide cooling via radiative heat transfer. For example, FIG. 11 illustrates a cooling setup 1100 employing densified, delignified wood 1110. When the densified, delignified wood 110 faces a clear sky 1106 in an open environment, its surface radiates heat 1104, while absorbing solar irradiance 1006 and any thermal radiation emitted by the atmosphere. However, due to the optical properties of the surface of the wood 1110, most of the solar radiation 1006 is reflected 1020 rather than being absorbed by the wood 1110. As a result, the emitted heat flux 1104 of the densified, delignified wood 1110 overwhelms any solar radiation 1006 absorbed by the densified, delignified wood, yielding a continuous net emitted heat flux.

At the same time, heat can be transferred from the ambient to the wood 1110 via conduction and convection (non-radiative processes) because of the temperature difference between the wood 1110 and ambient. Moreover, heat 1108 may be transferred from a heat source 1102 to the wood 1110. Heat is conducted through the thickness of the wood 1110 from the back surface to the front surface via the transverse thermal conductivity and can be emitted via radiation to the sky 1106. Alternatively or additionally, the heat source 1102 may be disposed at an end of the wood 1110 (as shown by the dashed lines in FIG. 11), so that heat 1108 is transferred parallel to the tree growth direction 206, thereby taking advantage of the relatively higher axial thermal conductivity of the wood 1110.

In some embodiments, the heat source 1102 may be an internal environment or structure separated from an external environment by the piece of delignified, densified wood 1110. In such embodiments, the densified, delignified wood 1110 may be considered to provide passive cooling, since no machinery or external energy is otherwise required to provide the cooling effect. Alternatively or additionally, the heat source 1102 may be part of a heat transfer system, for example, a heat exchanger or other component of a heating, ventilation, and air condition (HVAC) system, where heat 1108 from the system is dumped to the densified, delignified wood 1110 for radiative cooling. In such embodiments, the delignified, densified wood 1110 may be considered to be part of an active cooling system.

Figure 13A:
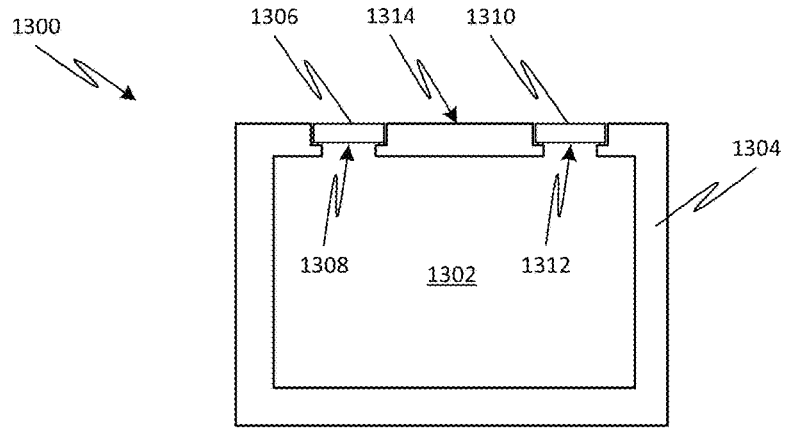
FIG. 13A is a simplified illustration of a testing setup for passive cooling experiments employing natural wood and densified, delignified wood, according to one or more embodiments of the disclosed subject matter.

To test the effect of passive cooling using the densified, delignified wood, a testing setup 1300 as illustrated in FIG. 13A was used. In particular, identically sized samples (e.g., 60 mm×45 mm×3 mm) of delignified, densified wood 1306 and natural wood 1310 were placed in respective windows of a polystyrene enclosure 1304, with an interior volume 1302 of the enclosure 1304 insulated from the external environment. The surface 1314 of the enclosure 1304 was covered in a mirror film, which was reflective with respect to solar radiation, in order to reduce the effect of heating via solar radiation absorption. At room temperature (300 K), the densified, delignified wood shows an emitted heat flux of 37.4 W/m$^2$ and 112.4 W/m$^2$ during daytime and nighttime, respectively. Notably, the emitted heat flux increases along with the ambient temperature, which is desirable in practical applications.

Figure 13B:
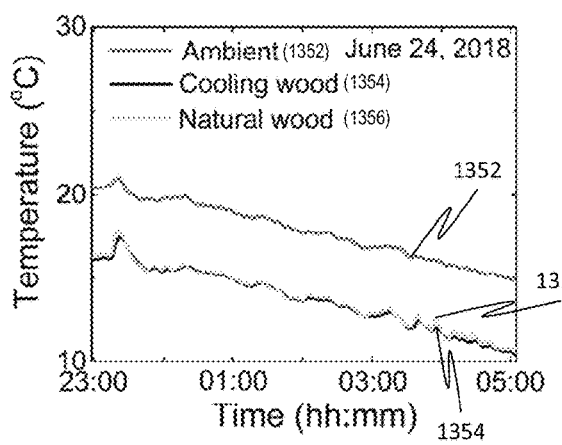
FIGS. 13B-13C are graphs of temperature profiles of natural wood and densified, delignified wood, in the setup of FIG. 13A, during the nighttime and daytime, respectively.
Figure 13C:
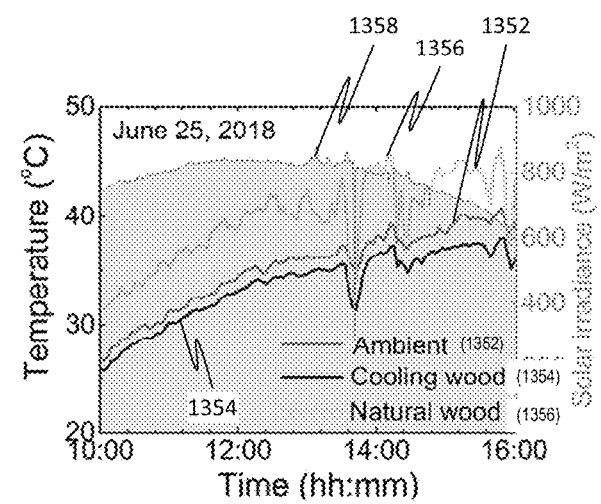

The bottom surface 1308 of the densified, delignified wood 1306 and the bottom surface 1312 of the natural wood 1310 were measured to ascertain the temperature change of the respective material over time. FIGS. 13B-13C are graphs of the resulting temperature profiles of natural wood 1356 and densified, delignified wood 1354 during the nighttime and daytime, respectively, as well as the level of incident solar radiation 1358 during the daytime. When it faces a clear sky, the densified, delignified wood 1354 demonstrates temperatures that are below ambient temperature 1352 as a result of the radiative cooling for both nighttime and daytime operation.

During the night (FIG. 13B), the steady-state temperature of the densified, delignified wood 1354 was 4.1±0.2° C. below ambient 1352. Since the natural wood behaves as a black emitter with high emissivity in the mid-infrared region, it has the same temperature profile 1356 as the densified, delignified wood 1354. However, during the day (FIG. 13C), the densified, delignified wood 1354 was able to maintain its temperature below ambient 1352 despite the exposure to solar radiation. In particular, the back surface of the densified, delignified wood 1354 was cooled by 1.4°±0.5° C. below ambient 1352 under the exposure of over 800 W/m$^2$ solar irradiance from 10:54 am to 14:02 pm (where the dip in temperature profiles at 13:46 pm was caused by a brief blockage of sunshine from scattered clouds). In contrast, the back-surface temperature of the natural wood 1356 was 4.7°±1.7° C. above the ambient air temperature 1352 because of the heating effect by light absorption. As compared to the natural wood, a temperature reduction of 6.1°±1.4° C. can be obtained through the use of densified, delignified wood. Note that the cooling performance in favorable atmospheric conditions could be further improved.

While the densified, delignified wood demonstrates excellent passive radiative cooling behavior, practical applications require stable performance under different weather conditions, such as varying levels of humidity, as well as to resistance to degradation despite exposure to water and other elements. To improve the stability of the densified, delignified wood against water, the wood material can be made hydrophobic prior to use. For example, the densified, delignified wood can be subjected to a fluoro-silane treatment (e.g., 1H, 1H, 2H, 2H-perfluorodecyltriethoxysilane as part of the pre-pressing treatment 120 described above). The fluoro-silane treatment is capable of introducing a superhydrophobic surface, with a static water contact angle of ~150°. Moreover, such a treatment can easily penetrate into the mesoporous structure, rendering the densified, delignified wood superhydrophobic even from the inside, with little change to the optical and thermal properties supporting the radiative cooling performance of the wood.

Although the above discussion focuses on the use of densified, delignified wood, it also possible to use delignified wood (i.e., without pressing) or partially-densified, delignified wood (i.e., with less than full pressing) for cooling applications. However, the reduced thermal conductivity of the delignified wood or partially-densified, delignified wood, as compared to the densified, delignified wood, may reduce the heat transfer through the wood and thus inhibit the effectiveness in such cooling applications.

Figure 10A:
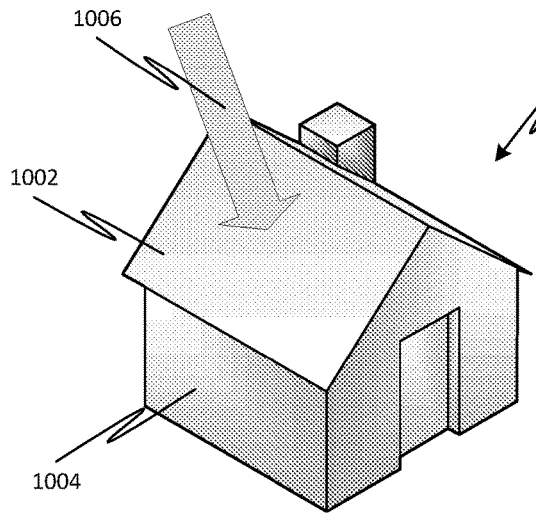
FIG. 10A is a simplified illustration of a building including delignified wood as structural components, according to one or more embodiments of the disclosed subject matter.

In embodiments, the disclosed wood materials can be adapted for use in a variety of applications, with the mechanical and thermal properties of the material tailored to fit the particular application. For example, FIG. 10A shows a building structure 1000, where embodiments of the disclosed wood materials may be used as one or more exterior components of the structure 1000. For example, the wood materials may form a part of the roof 1002, siding 1004, or any other component of the structure 1000.

When the wood material is designed to be self-supporting and provide insulation, the wood material for the roof 1002, siding 1004, or other component may be partially-pressed, delignified wood, which exhibits a mix of thermally insulating properties and improved mechanical strength. When the wood material is designed to be supported by other structures (for example, as described below with respect to FIG. 10B), the wood material for the roof 1002, siding 1004, or other component may be unpressed or minimally-pressed (i.e., less than 20% reduction in thickness) delignified wood, which exhibits superior thermal insulation but at the cost of lower mechanical strength. When the wood material is designed to optimize passive cooling, the wood material for the roof 1002, siding 1004 or other component may be partially-densified, delignified wood or densified, delignified wood, which enjoys an improved thermal conductivity as compared to unpressed delignified wood, thereby allowing heat from the back side of the wood in thermal communication with a heat source to be transmitted through the wood for emission to the sky. Moreover, the improved strength in both tension and compression of the densified wood can allow it to be used as the exterior component of the structure 1000 without separate mechanical support. The wood material in the building structure 1000, whether unpressed, densified, or partially-densified, can have optical properties that act to reflect incoming solar radiation 1006, and thereby minimize, or at least reduce, heating of the structure 1000 due to absorption of solar radiation 1006.

Figure 10B:
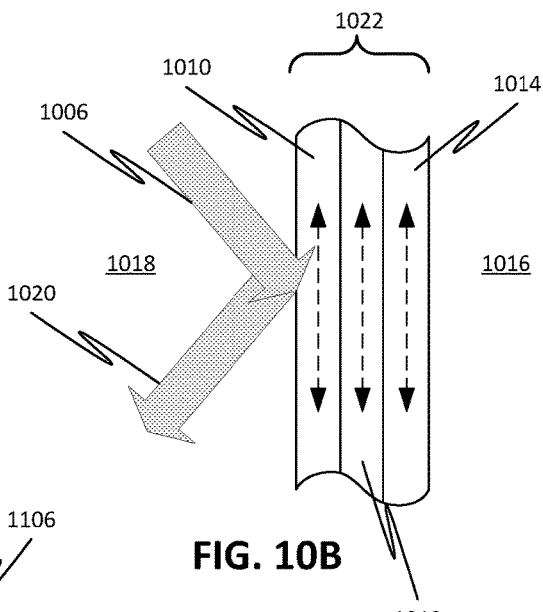
FIG. 10B is a simplified illustration of a cross-section of a structural material including one or more pieces of delignified wood, according to one or more embodiments of the disclosed subject matter.

In embodiments, the disclosed wood materials can form a composite structure 1022, for example, as shown in FIG. 10B. For example, varieties of the disclosed wood materials with different thermal or mechanical properties can be combined together, or a particular wood material may be combined with other types of materials to form the composite structure. As illustrated in FIG. 10B, the composite structure 1022 includes multiple layers 1010-1014 separating an internal environment 1016 from an external environment 1018.

For example, the outermost layer 1010 can be formed of a densified, delignified wood material or partially-densified, delignified wood material so as to provide structural support. The unique optical properties of the delignified wood can also allow the outermost layer 1010 to effectively reflect 1020 incoming solar radiation 1006, thereby minimizing heating due to solar absorption and potentially offering passive cooling as described above. For example, the innermost layer 1014 can be formed of a partially-densified, delignified wood material so as to provide structural support and insulation, and the middle layer 1012 can formed of minimally densified (e.g., ≤20% of original thickness), delignified wood or unpressed, delignified wood, so as to provide superior insulation while relying on the outer 1010 and inner 1014 layers for structural support. Any heating caused by solar radiation 1006 can thus be isolated to the outermost layer 1010, which can cool itself by passive cooling, and the internal environment 1016 can be efficiently insulated from the external environment 1018 by the multilayer insulation provided by middle 1012 and inner 1014 layers.

Other configurations and material selection for the composite structure 1022 besides those explicitly discussed above are also possible according to one or more contemplated embodiments. For example, the orientation with respect to the tree growth direction 206 of the layers of the composite structure may be different from each other (for example, as described below with respect to FIGS. 17A-17C). Alternatively or additionally, the wood materials may be combined with other types of materials, such as natural wood, processed wood, wood that has been partially delignified and/or densified, dry wall, metal, or other building materials, to form the composite structure.

Figures 17A, 17B, 17C:
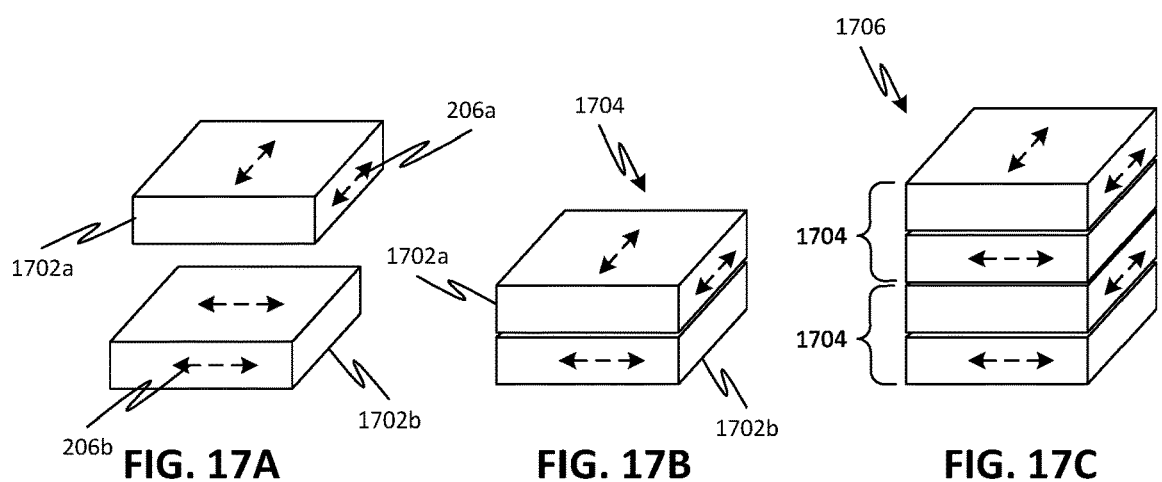
FIG. 17A is a simplified schematic of an arrangement of pieces of delignified wood for forming a laminate structure, according to one or more embodiments of the disclosed subject matter.
FIG. 17B is a simplified schematic of a laminate structure formed by the wood pieces of FIG. 17A, according to one or more embodiments of the disclosed subject matter.
FIG. 17C is a simplified schematic of a multi-layer laminate structure formed of the structure of FIG. 17B, according to one or more embodiments of the disclosed subject matter.

Although only three layers are shown in FIG. 10B, embodiments of the disclosed number are not limited to the illustrated number. Rather, two or more layers are possible according to one or more contemplated embodiments. For example, two or more delignified wood pieces 1702a, 1702b (which may be a wood block, wood chip, or wood pieces of different size/shape) can be combined together to form a laminate unit 1704, which itself may be combined with other laminate units to form a multilayer laminate 1706, as illustrated in FIGS. 17A-17C. The laminate unit 1704 may be designed to enhance the anisotropic nature of the thermal and mechanical properties of the underlying wood materials, e.g., by aligning respective wood directions 206a, 206b, or to reduce the anisotropy, e.g., by intentionally crossing wood directions 206a, 206b (as shown in FIGS. 17A-17C) or providing a random orientation of wood directions 206a, 206b.

The wood pieces 1702a, 1702b can be joined together by glue or epoxy, or by hydrogen bonding. The wood pieces 1702a, 1702b can be joined together before the pressing for densification or as part of the pressing for densification when densification is desired, or just after the delignification when no densification is desired. For example, in those embodiments where hydrogen bonding is used, the joining can include pressing the aligned pieces 1702a, 1702b together under high pressure, similar to the pressing used to form the densified wood pieces. In other embodiments, the joining of wood pieces may be combined with the pressing to densify the wood pieces. The pressing is thus effective to compress each wood piece (i.e., to produce densified, delignified wood pieces) and to cause hydrogen bonding to form between facing surfaces of the wood pieces.

Although rinsing, drying, pre-pressing modification, humidification, and post-pressing modification have not been separately illustrated in FIGS. 17A-17C, it will be understood that these embodiments can also include the features of process 100 of FIG. 1. In addition, although a particular number of densified, delignified wood materials for a laminated structure is illustrated in FIGS. 17A-17C, other numbers of densified, delignified wood materials are also possible according to one or more contemplated embodiments.

Moreover, the laminate unit 1704 can be formed of different wood materials in combination with the disclosed delignified wood materials. For example, one component of the laminate can be a densified, delignified wood material, a second component can be an unpressed, delignified wood material, and a third component can be a partially-densified, delignified wood material, such as described above with respect to FIG. 10B. In another example, one component of the laminate can be a densified, delignified wood material, and another component can be a natural wood material, an unpressed, partially-delignified wood material, or a partially-delignified, densified wood material. Other configurations are also possible according to one or more contemplated embodiments.

Moreover, although rectangular shapes are illustrated in FIGS. 17A-17C, other shapes are also possible according to one or more contemplated embodiments. Indeed, wood chips may have irregular or different shapes/sizes prior to being combined into the laminate structure.

In other embodiments, the orientations 206a, 206b of coupled pieces of wood 1702a, 1702b may be at a non-orthogonal angle with respect to each other. Thus, the first piece 1702a can be coupled to the second piece 1702b such that a direction of the orientation 206a of the first piece merely crosses a direction of the orientation 206b of the second piece in a plan view. In addition, other orientations and alignments beyond those illustrated in FIGS. 17A-17C are also possible according to one or more contemplated embodiments. In some embodiments, the orientations of adjacent pieces may be aligned, for example, to enhance anisotropy.

Although FIGS. 10A-10B and 17A-17C have been discussed with respect to structural components for a building, embodiments of the disclosed subject matter are not limited thereto. Rather, the disclosed wood materials can be adapted to a variety of applications beyond building structures, such as, but not limited to, packaging, ornamentation (e.g., to take advantage of the unique visual appearance offered by the white color and underlying wood structure), and electrical devices.

Figure 14:
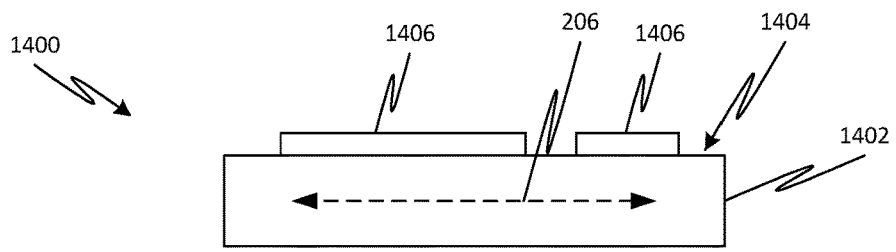
FIG. 14 is a simplified illustration of an electronics device including delignified wood, according to one or more embodiments of the disclosed subject matter.

For example, FIG. 14 shows an electrical device 1400 that employs delignified wood 1402 (whether unpressed, partially-densified, or densified) as a substrate for supporting one or more electronic components 1406. Especially when the delignified wood 1402 has undergone some degree of densification, the top surface 1404 may have a low surface roughness, e.g., 10 nm or less, that allows electronic components 1406 to be formed directly on the delignified wood 1402. The wood surface 1404 is also naturally electrically insulating, thereby allowing direct formation of the electronic components 1406 thereon. Alternatively, an intervening layer may be formed on wood surface 1404, with the electronic components 1406 formed on the intervening layer. Thus, the electrical circuit may be considered integrated with the delignified wood material. For example, the display device may be an integral part of the delignified wood that forms a wall in a building.

The electronic components 1406 can include one or more of transistors, capacitors, resistors, inductors, electrical conductors, electrical insulators, and energy storage components (e.g., battery) and can form one or more desired electrical circuits. For example, the electronic components 1406 may form a display device. Other electronic devices integrated with the disclosed delignified wood materials are also possible according to one or more embodiments, including, but not limited to, integrated sensors and input/output interfaces.

Figure 15:
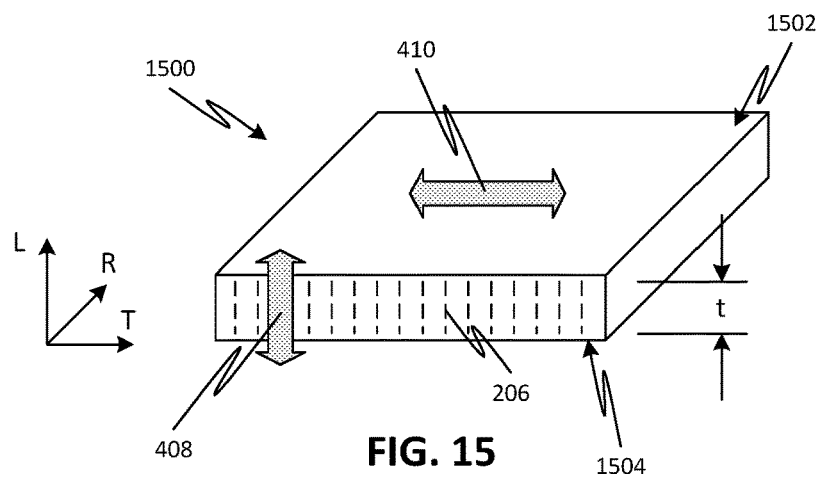
FIG. 15 is a simplified illustration of delignified wood with anisotropic thermal conductivity and a lumina orientation different from that of FIG. 4A, according to one or more embodiments of the disclosed subject matter.

Although the above discussion has focused on the wood materials with a direction of extension 206 being perpendicular to the thickness direction (where the thickness, t, is considered the smallest dimension of the wood material), it is also possible for the wood material to have a different direction of extension 206. For example, as illustrated in FIG. 15, the direction of extension 206 is along (i.e., substantially parallel to) the thickness direction and is substantially perpendicular to the top surface 1502 and bottom surface 1504. As a result, the axial thermal conductivity 408 between the top 1502 and bottom 1504 surfaces is higher than the transverse thermal conductivity 410 in planes parallel to the top 1502 and bottom 1504 surfaces. Such a configuration may be advantageous in certain applications, for example, in passive cooling applications where it is desirable to transfer heat from the back surface 1504 to the front surface 1502 for emission.

Figure 16:
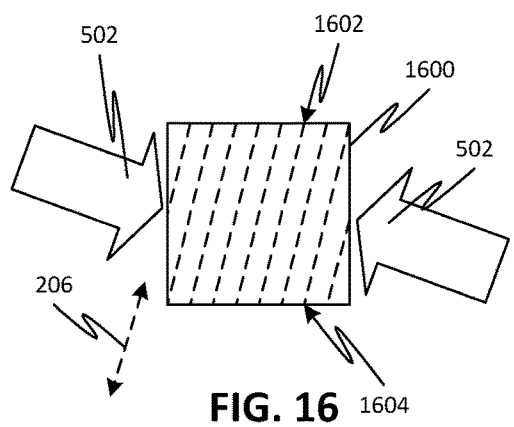
FIG. 16 is a simplified illustration of delignified wood subject to densification and having a lumina and/or pressing orientation different from that of FIG. 5A, according to one or more embodiments of the disclosed subject matter.

Moreover, the orientation of the direction of extension 206 may be at angle other than 0° or 90° with respect to the exterior surfaces of the wood. For example, FIG. 16 shows an example where wood material 1600 has a direction of extension 206 that is at a non-zero angle with respect to the top 1602 and bottom 1604 surfaces. When the direction of extension 206 is angled as illustrated in FIG. 16 or otherwise, pressing 502 to effect densification may also be angled, either with respect to the external surfaces (as shown) or with respect to the direction of extension 206 (not shown), to encourage reorientation of the alignment of the cellulose nanofibers.

In one or more first embodiments, a structure comprises a first piece of natural wood that has been chemically treated to remove lignin from the natural wood while substantially preserving a structure of cellulose-based lumina of the natural wood. At least 90% of the lignin in the natural wood has been removed by the chemical treatment.

In the first embodiments or any other embodiment, the lignin in the first piece is less than 5 wt %, less than or equal to 1 wt %, or less than or equal to 0.6 wt %.

In the first embodiments or any other embodiment, the first piece has an axial thermal conductivity in a direction of extension of the lumina and a transverse thermal conductivity in a direction perpendicular to the direction of extension of the lumina, and the axial thermal conductivity is greater than the transverse thermal conductivity. In the first embodiments or any other embodiment, the axial thermal conductivity is at least two times greater than the transverse thermal conductivity, the axial thermal conductivity is at least five times greater than the transverse thermal conductivity, or the axial thermal conductivity is at least ten times greater than the transverse thermal conductivity. In the first embodiments or any other embodiment, the transverse thermal conductivity is less than 0.2 W/m-K, is less than 0.1 W/m-K, or is less than 0.05 W/m-K.

In the first embodiments or any other embodiment, the first piece has an emissivity of at least 0.8 in a wavelength range of 8 μm to 13 μm, or at least 0.9 in the wavelength range of 8 μm to 13 μm.

In the first embodiments or any other embodiment, the first piece has an absorbance of less than or equal to 10% in a wavelength range of 400 nm to 1100 nm, or less than or equal to 8% in a wavelength range of 400 nm to 1100 nm.

In the first embodiments or any other embodiment, a first emissivity of the first piece in a wavelength range of 400-1100 nm is less than a second emissivity of the first piece in a wavelength range of 8-13 μm. In the first embodiments or any other embodiment, the second emissivity is at least 3 times, at least 5 times, at least 8 times, or at least 10 times the first emissivity. In the first embodiments or any other embodiment, the second emissivity is at least 0.8 and the first emissivity is less than or equal to 0.1.

In the first embodiments or any other embodiment, cellulose nanofibers in the first piece are substantially aligned along a direction of extension of the lumina. In the first embodiments or any other embodiment, the first piece has nanopores between the aligned cellulose nanofibers. In the first embodiments or any other embodiment, inner volumes of the cellulose-based lumina of the first piece are open or unobstructed.

In the first embodiments or any other embodiment, the first piece has an increased flexibility as compared to the natural wood before the chemical treatment. In the first embodiments or any other embodiment, a bend radius of the first piece is at least two times smaller than that of the natural wood before the chemical treatment.

In the first embodiments or any other embodiment, the lumina extend perpendicular to a thickness direction of the first piece. In the first embodiments or any other embodiment, the lumina extend in a thickness direction of the first piece. In the first embodiments or any other embodiment, a dimension of the first piece in a direction perpendicular to the thickness direction is greater than a thickness of the first piece in the thickness direction.

In the first embodiments or any other embodiment, a thickness of the first piece is less than or equal to 1 mm.

In the first embodiments or any other embodiment, the chemically treated wood of the first piece has been pressed in a first direction crossing a direction of extension of the lumina such that the lumina at least partially collapse. In the first embodiments or any other embodiment, the first piece has a thickness in said first direction that is no more than 40% reduced as compared to that of the natural wood, or that is no more than 20% reduced as compared to that of the natural wood. In the first embodiments or any other embodiment, the first piece has a thickness in said first direction that is at least 40% reduced as compared to that of the natural wood, or that is at least 80% reduced as compared to that of the natural wood.

In the first embodiments or any other embodiment, the first piece has an increased density as compared to the natural wood before the chemical treatment. In the first embodiments or any other embodiment, the density of the first piece is at least two times greater than that of the natural wood before the chemical treatment.

In the first embodiments or any other embodiment, the first piece has a surface roughness that is 10 nm or less.

In the first embodiments or any other embodiment, the first piece has a mechanical property that is increased as compared to that of the natural wood before the chemical treatment. In the first embodiments or any other embodiment, a specific tensile strength of the first piece is at least 200 MPa-cm$^3$/g, at least 300 MPa-cm$^3$/g, or at least 330 MPa-cm$^3$/g.

In the first embodiments or any other embodiment, the structure further includes a second piece of natural wood that has been chemically treated to remove lignin from the natural wood while substantially preserving a structure of cellulose-based lumina of the natural wood. At least 90% of the lignin in the natural wood having been removed by the chemical treatment, and the first and second pieces are coupled to each other along facing surfaces. A direction of extension of the lumina of the first piece crosses a direction of extension of the lumina of the second piece. In the first embodiments or any other embodiment, the direction of extension of the lumina of the first piece is orthogonal to the direction of extension of the lumina of the second piece. In the first embodiments or any other embodiment, the first and second pieces are coupled to each other by at least one of hydrogen bonding, glue, and epoxy. In the first embodiments or any other embodiment, each of the first and second pieces is formed as a flat sheet, a block, a stick, a strip, a hollow shape, a membrane, a film with thickness less than 200 μm, a wood chip, or a wood flake. In the first embodiments or any other embodiment, the chemically treated natural wood of the first piece and the second piece have been pressed in a direction crossing a respective direction of extension of the lumina therein, such that the lumina at least partially collapse.

In the first embodiments or any other embodiment, the first piece consists essentially of the chemically treated natural wood.

In the first embodiments or any other embodiment, the first piece is hydrophobic. In the first embodiments or any other embodiment, the first piece exhibits a static contact angle of at least 90°, or a dynamic contact angle less than 10°. In the first embodiments or any other embodiment, the first piece has been chemically treated so as to be hydrophobic, and the chemical treatment comprises at least one of epoxy resin, silicone oil, polyurethane, paraffin emulsion, acetic anhydride, octadecyltrichloro silane (OTS), 1H, 1H, 2H, 2H-perfluorodecyltriethoxysilane, fluoroesin, polydimethylsiloxane (PDMS), methacryloxymethyltrimethyl-silane (MSi), polyhedral oligomeric silsesquioxane (POSS), potassium methyl siliconate (PMS), dodecyl(trimethoxy) silane (DTMS), hexamethyldisiloxane, dimethyl diethoxy silane, tetraethoxysilane, methyltrichlorosilane, ethyltrimethoxysilane, methyl triethoxysilane, rimethylchlorosilane, phenyltrimethoxysilane, phenyltriethoxysilane, propyltrimethoxysilane, polymethyl methacrylate, polydiallyldimethylammonium chloride (polyDADMAC), 3-(trimethoxysilyl)propyl methacrylate (MPS, hydrophobic stearic acid, amphiphilic fluorinated triblock azide copolymers, polyvinylidene fluoride and fluorinated silane, n-dodecyltrimethoxysilane, and sodium lauryl sulfate.

In the first embodiments or any other embodiment, the first piece has been chemically treated so as to be resistant to weather or salt water In the first embodiments or any other embodiment, the chemical treatment for resistance to weather or salt water comprises at least one of cupramate (CDDC), ammoniacal copper quaternary (ACQ), chromated copper arsenate (CCA), ammoniacal copper zinc arsenate (ACZA), copper naphthenate, acid copper chromate, copper citrate, copper azole, copper 8-hydroxyquinolinate, pentachlorophenol, zinc naphthenate, copper naphthenate, kreosote, titanium dioxide, propiconazole, tebuconazole, cyproconazole, boric acid, borax, organic iodide (IPBC), and $Na_2B_8O_{13} \cdot 4H_2O$.

In the first embodiments or any other embodiment, the structure further includes a coating on one or more external surfaces of the first piece. In the first embodiments or any other embodiment, the coating comprises an oil-based paint, a hydrophobic paint, a polymer coating, or a fire-resistant coating. In the first embodiments or any other embodiment, the fire-resistant coating includes at least one of boron nitride, montmorillonite clay, hydrotalcite, silicon dioxide ($SiO_2$), sodium silicate, calcium carbonate ($CaCO_3$), aluminum hydroxide ($Al(OH)_3$), magnesium hydroxide ($Mg(OH)_2$), magnesium carbonate ($MgCO_3$), aluminum sulfate, iron sulfate, zinc borate, boric acid, borax, triphenyl phosphate (TPP), melamine, polyurethane, ammonium polyphosphate, phosphate, phosphite ester, ammonium phosphate, ammonium sulfate, phosphonate, diammonium phosphate (DAP), ammonium dihydrogen phosphate, monoammonium phosphate (MAP), guanylurea phosphate (GUP), guanidine dihydrogen phosphate, and antimony pentoxide.

In the first embodiments or any other embodiment, the first piece is white in color. In the first embodiments or any other embodiment, the first piece has been a dyed a color other than white.

In the first embodiments or any other embodiment, the structure further includes a heat source in thermal communication with the first piece, and the first piece is exposed so as to radiate heat from the heat source to the sky. In the first embodiments or any other embodiment, a surface of the first piece that is exposed is substantially parallel to a direction of extension of the lumina.

In the first embodiments or any other embodiment, the structure further includes an electrical component formed over a surface of the first piece. In the first embodiments or any other embodiment, the electrical component comprises at least one of a transistor, capacitor, resistor, and inductor.

In one or more second embodiments, a structure is formed by removing at least 90% of lignin from a piece of natural wood while substantially retaining cellulose-based lumina.

In one or more third embodiments, a structure is formed by removing at least 90% of lignin from a piece of natural wood while substantially retaining cellulose-based lumina and then pressing such that the lumina at least partially collapse.

In the third embodiments or any other embodiment, a thickness of the piece after pressing is reduced by at least 40% as compared to that of the natural wood, or by at least 80% as compared to that of the natural wood. In the third embodiments or any other embodiment, a thickness of the piece after pressing is reduced by no more than 40% as compared to that of the natural wood, or by no more than 20% as compared to that of the natural wood.

In the second embodiments, the third embodiments, or any other embodiment, the piece has less than or equal to 5 wt % of lignin therein, or less than or equal to 1 wt % of lignin therein.

In the second embodiments, the third embodiments, or any other embodiment, the piece has an anisotropic thermal conductivity.

In the second embodiments, the third embodiments, or any other embodiment, the piece absorbs less than or equal to 10% of solar radiation and has an emission greater than or equal to 90% in an atmospheric transmission window.

In the second embodiments, the third embodiments, or any other embodiment, the piece is hydrophobic.

In the second embodiments, the third embodiments, or any other embodiment, the piece is coupled together with another piece of natural wood, which has at least 90% of lignin removed therefrom, to form a laminate.

In the second embodiments, the third embodiments, or any other embodiment, the piece is substantially white in color.

In one or more fourth embodiments, a method includes removing at least 90% of lignin from a piece of natural wood while substantially retaining cellulose-based lumina of the natural wood, thereby producing a piece of delignified wood.

In the fourth embodiments or any other embodiment, the delignified wood is substantially white in color.

In the fourth embodiments or any other embodiment, the removing comprises immersing the piece of natural wood in a chemical solution comprising at least one of NaOH, $Na_2S$, $NaHSO_3$, $SO_2$, $H_2O$, $Na_2SO_3$, Anthraquinone (AQ), $Na_2S_n$ (where n is an integer), $CH_3OH$, $C_2H_5OH$, $C_4H_9OH$, HCOOH, $NH_3$, p-TsOH, $NH_3$—$H_2O$, $H_2O_2$, NaClO, $NaClO_2$, $CH_3COOH$ (acetic acid), $ClO_2$, and $Cl_2$.

In the fourth embodiments or any other embodiment, the removing comprises immersing the piece of natural wood in a first chemical solution followed by immersing in a second chemical solution. In the fourth embodiments or any other embodiment, the first chemical solution comprises a mixture of NaOH and $Na_2SO_3$ and the second chemical solution comprises $H_2O_2$.

In the fourth embodiments or any other embodiment, the method further includes at least one of (a) after the removing, drying the piece of delignified wood by freeze drying or critical point drying, such that the cellulose-based lumina remain open or unobstructed in a cross-sectional view; (b) after the removing, rinsing the delignified wood to remove residual chemicals from the removing; (c) after the rinsing, drying the piece of delignified wood; (d) after the rinsing, exposing the delignified wood to 90% relative humidity for a first time period; (e) pressing the delignified wood; (f) prior to or after the pressing, subjecting the wood to a hydrophobic treatment; (g) dyeing the delignified wood a color different from white; (h) chemically treating the delignified wood to be resistant to weather or salt water; and (i) coating a surface of the delignified wood.

In the fourth embodiments or any other embodiment, a solution for the rinsing comprises at least one of ethanol and de-ionized (DI) water.

In the fourth embodiments or any other embodiment, the pressing is such that a thickness of the wood is reduced between 0% and 40%, or between 0% and 20%, inclusive. In the fourth embodiments or any other embodiment, the pressing is such that a thickness of the wood is reduced by at least 40%, or by at least 80%. In the fourth embodiments or any other embodiment, the pressing is performed at a temperature of 20-120° C., and at a pressure of 0.5-10 MPa. In the fourth embodiments or any other embodiment, a microporous filter membrane or filter paper is disposed on a surface of the delignified wood prior to or during the pressing. In the fourth embodiments or any other embodiment, the pressing is in a direction crossing a direction of extension of the cellulose-based lumina. In the fourth embodiments or any other embodiment, after the pressing, the delignified wood has a surface roughness of 10 nm or less.

In the fourth embodiments or any other embodiment, the hydrophobic treatment comprises at least one of epoxy resin, silicone oil, polyurethane, paraffin emulsion, acetic anhydride, octadecyltrichloro silane (OTS), 1H, 1H, 2H, 2H-perfluorodecyltriethoxysilane, fluoroesin, polydimethylsiloxane (PDMS), methacryloxymethyltrimethyl-silane (MSi), polyhedral oligomeric silsesquioxane (POSS), potassium methyl siliconate (PMS), dodecyl(trimethoxy) silane (DTMS), hexamethyldisiloxane, dimethyl diethoxy silane, tetraethoxysilane, methyltrichlorosilane, ethyltrimethoxysilane, methyl triethoxysilane, rimethylchlorosilane, phenyltrimethoxysilane, phenyltriethoxysilane, propyltrimethoxysilane, polymethyl methacrylate, polydiallyldimethylammonium chloride (polyDADMAC), 3-(trimethoxysilyl)propyl methacrylate (MPS, hydrophobic stearic acid, amphiphilic fluorinated triblock azide copolymers, polyvinylidene fluoride and fluorinated silane, n-dodecyltrimethoxysilane, and sodium lauryl sulfate.

In the fourth embodiments or any other embodiment, the hydrophobic treatment is performed before the pressing and comprises 1H, 1H, 2H, 2H-perfluorodecyltriethoxysilane.

In the fourth embodiments or any other embodiment, the chemical treatment for resistance to weather or salt water comprises at least one of cupramate (CDDC), ammoniacal copper quaternary (ACQ), chromated copper arsenate (CCA), ammoniacal copper zinc arsenate (ACZA), copper naphthenate, acid copper chromate, copper citrate, copper azole, copper 8-hydroxyquinolinate, pentachlorophenol, zinc naphthenate, copper naphthenate, kreosote, titanium dioxide, propiconazole, tebuconazole, cyproconazole, boric acid, borax, organic iodide (IPBC), and $Na_2B_8O_{13} \cdot 4H_2O$.

In the fourth embodiments or any other embodiment, the coating comprises an oil-based paint, a hydrophobic paint, a polymer coating, or a fire-resistant coating.

In the fourth embodiments or any other embodiment, the fire-resistant coating includes at least one of boron nitride, montmorillonite clay, hydrotalcite, silicon dioxide ($SiO_2$), sodium silicate, calcium carbonate ($CaCO_3$), aluminum hydroxide ($Al(OH)_3$), magnesium hydroxide ($Mg(OH)_2$), magnesium carbonate ($MgCO_3$), aluminum sulfate, iron sulfate, zinc borate, boric acid, borax, triphenyl phosphate (TPP), melamine, polyurethane, ammonium polyphosphate, phosphate, phosphite ester, ammonium phosphate, ammonium sulfate, phosphonate, diammonium phosphate (DAP), ammonium dihydrogen phosphate, monoammonium phosphate (MAP), guanylurea phosphate (GUP), guanidine dihydrogen phosphate, and antimony pentoxide.

In the fourth embodiments or any other embodiment, the method further includes disposing the piece of delignified wood such that a surface thereof radiates heat to the sky. In the fourth embodiments or any other embodiment, the surface is substantially parallel to a direction of extension of the lumina.

In the fourth embodiments or any other embodiment, the method further includes forming the piece of delignified wood as a building material, a packaging material, or other structural material.

In the fourth embodiments or any other embodiment, the method further includes forming one or more electrical components on a surface of the piece of delignified wood.

In the fourth embodiments or any other embodiment, the method of further includes cooling a structure or environment using the piece of delignified wood to radiate energy. In the fourth embodiments or any other embodiment, the cooling is passive cooling. In the fourth embodiments or any other embodiment, the piece of delignified wood has a first emissivity in a wavelength range of 400-1100 nm and a second emissivity in a wavelength range of 8-13 µm, and the first emissivity is less than the second emissivity. In the fourth embodiments or any other embodiment, the second emissivity is at least 3 times, at least 5 times, at least 8 times, or at least 10 times the first emissivity. In the fourth embodiments or any other embodiment, the second emissivity is at least 0.8 and the first emissivity is less than or equal to 0.1.

In the fourth embodiments or any other embodiment, the piece of delignified wood radiates more energy than it absorbs. In the fourth embodiments or any other embodiment, thermal conductivity of the piece of delignified wood is anisotropic. In the fourth embodiments or any other embodiment, thermal conductivity of the piece of delignified wood in a direction parallel to an exposed surface of the delignified wood is greater than thermal conductivity of the piece of delignified wood in a direction perpendicular to the exposed surface.

In the fourth embodiments or any other embodiment, the method further includes removing at least 90% lignin from another piece of natural wood while substantially retaining cellulose-based lumina of the natural wood, thereby producing another piece of delignified wood, and coupling a surface of the piece of delignified wood to a surface of the another piece of delignified wood. In the fourth embodiments or any other embodiment, a direction of extension of the lumina of the piece of delignified wood crosses a direction of extension of the lumina of the another piece of delignified wood. In the fourth embodiments or any other embodiment, the piece of delignified wood and the another piece of delignified wood are coupled to each other by at least one of hydrogen bonding, glue, and epoxy.

In the fourth embodiments or any other embodiment, the method includes, prior to or after the coupling, pressing the piece of delignified wood and the another piece of delignified wood in a direction crossing a respective direction of extension of the lumina therein, such that the lumina at least partially collapse.

In the first through fourth embodiments, or any other embodiment, the natural wood comprises a hardwood, a softwood, or bamboo. In the first through fourth embodiments, or any other embodiment, the natural wood comprises basswood, oak, poplar, ash, alder, aspen, balsa wood, beech, birch, cherry, butternut, chestnut, cocobolo, elm, hickory, maple, oak, padauk, plum, walnut, willow, yellow-poplar, bald cypress, cedar, cypress, douglas fir, fir, hemlock, larch, pine, redwood, spruce, tamarack, juniper, or yew.

In one or more fifth embodiments, an active or passive cooling device includes a structure according to any of the first through fourth embodiments, or any other embodiment.

In one or more sixth embodiments, an insulating material includes a structure according to any of the first through fifth embodiments, or any other embodiment.

In one or more seventh embodiments, an electronic device includes a structure according to any of the first through sixth embodiments, or any other embodiment. In the seventh embodiments or any other embodiment, at least one electrical component is formed over a surface of the structure. In the seventh embodiments or any other embodiment, the electronic device is constructed as a display panel.

In one or more eighth embodiments, an packaging material includes a structure according to any of the first through seventh embodiments, or any other embodiment.

In one or more ninth embodiments, a building material includes a structure according to any of the first through eighth embodiments, or any other embodiment. In the ninth embodiments or any other embodiment, the building material is constructed as an exterior surface of a building. In the ninth embodiments or any other embodiment, the exterior surface is at least one of a roof and siding of the building.

In one or more tenth embodiments, a material includes the structure according to any of the first through ninth embodiments, or any other embodiment. In the tenth embodiments or any other embodiment, the material is formed as an interior or exterior component of an automobile, a train, a truck, a plane, boat, ship, or any other transport, vehicle, or conveyance, a warehouse, factory, office building, barn, home, or any other building or structure. In the tenth embodiments or any other embodiment, the material forms a part of a container, box, or shipping crate; a display, decoration, window frame, picture frame, door or door frame, table, desk, chair, cabinet, wardrobe, bed, or any other piece of furniture or home accent; a bridge, dock, deck, or platform; a musical instrument; a protective cover, blast shield, or other protective device; a tool, athletic equipment, or sporting good.

In this application, unless specifically stated otherwise, the use of the singular includes the plural, and the separate use of "or" and "and" includes the other, i.e., "and/or." Furthermore, use of the terms "including" or "having," as well as other forms such as "includes," "included," "has," or "had," are intended to have the same effect as "comprising" and thus should not be understood as limiting.

Any range described herein will be understood to include the endpoints and all values between the endpoints. Whenever "substantially," "approximately," "essentially," "near," or similar language is used in combination with a specific value, variations up to and including 10% of that value are intended, unless explicitly stated otherwise.

The foregoing descriptions apply, in some cases, to examples generated in a laboratory, but these examples can be extended to production techniques. Thus, where quantities and techniques apply to the laboratory examples, they should not be understood as limiting.

It is thus apparent that there is provided, in accordance with the present disclosure, delignified wood materials, and methods for fabricating and use thereof. Many alternatives, modifications, and variations are enabled by the present disclosure. While specific examples have been shown and described in detail to illustrate the application of the principles of the present invention, it will be understood that the invention may be embodied otherwise without departing from such principles. For example, disclosed features may be combined, rearranged, omitted, etc. to produce additional embodiments, while certain disclosed features may sometimes be used to advantage without a corresponding use of other features. Accordingly, Applicant intends to embrace all such alternative, modifications, equivalents, and variations that are within the spirit and scope of the present invention.

The invention claimed is:

1. A structure comprising:
a first piece of natural wood that has been chemically treated to remove lignin from the natural wood and to increase a porosity as compared to the natural wood before chemical treatment, and subsequently dried by freeze drying or critical point drying so as to substantially preserve a structure of cellulose-based lumina of the natural wood with the increased porosity,
wherein inner volumes of the cellulose-based lumina remain open or unobstructed in a cross-sectional view,
at least 90% of the lignin in the natural wood has been removed by the chemical treatment,
the first piece has been chemically treated to be hydrophobic or is provided with a hydrophobic coating,
the first piece is substantially white in color, and
the first piece exhibits a reflectivity of at least 90% in a wavelength range of 400-700 nm.

2. The structure of claim 1, wherein the first piece has an emissivity of at least 0.8 in a wavelength range of 8 μm to 13 μm.

3. The structure of claim 1, wherein the first piece has an absorbance of less than or equal to 10% in a wavelength range of 400 nm to 1100 nm.

4. The structure of claim 1, further comprising a heat source in thermal communication with the first piece, wherein the first piece is exposed so as to radiate heat from the heat source to the sky.

5. The structure of claim 1, further comprising an electrical component formed over a surface of the first piece, wherein the electrical component comprises at least one of a transistor, capacitor, resistor, and inductor.

6. The structure of claim 1, wherein the lignin in the first piece is less than or equal to 1 wt %.

7. The structure of claim 1, wherein a density of the first piece is less than 0.3 g/cm$^3$.

8. The structure of claim 1, wherein the porosity of the first piece is greater than 60%.

9. The structure of claim 1, wherein the first piece consists essentially of the chemically treated natural wood.

10. The structure of claim 1, wherein the first piece exhibits a static contact angle of at least 90°, or a dynamic contact angle less than 10°.

11. The structure of claim 1, further comprising a fire-resistant coating on the first piece, wherein the fire-resistant coating comprises at least one of boron nitride, montmorillonite clay, hydrotalcite, silicon dioxide ($SiO_2$), sodium silicate, calcium carbonate ($CaCO_3$), aluminum hydroxide ($Al(OH)_3$), magnesium hydroxide ($Mg(OH)_2$), magnesium carbonate ($MgCO_3$), aluminum sulfate, iron sulfate, zinc borate, boric acid, borax, triphenyl phosphate (TPP), melamine, polyurethane, ammonium polyphosphate, phosphate, phosphite ester, ammonium phosphate, ammonium sulfate, phosphonate, diammonium phosphate (DAP), ammonium dihydrogen phosphate, monoammonium phosphate (MAP), guanylurea phosphate (GUP), guanidine dihydrogen phosphate, and antimony pentoxide.

12. The structure of claim 1,
wherein the first piece has an axial thermal conductivity in a direction of extension of the lumina and a transverse thermal conductivity in a direction perpendicular to the direction of extension of the lumina, and
the axial thermal conductivity is greater than the transverse thermal conductivity.

13. The structure of claim 12, wherein the transverse thermal conductivity is less than 0.2 W/m-K.

14. The structure of claim 1, wherein a first emissivity of the first piece in a wavelength range of 400-1100 nm is less than a second emissivity of the first piece in a wavelength range of 8-13 μm.

15. The structure of claim 14, wherein the second emissivity is at least 10 times the first emissivity.

16. A method comprising:
removing at least 90% of lignin from a piece of natural wood while substantially retaining cellulose-based lumina of the natural wood, thereby producing a piece of delignified wood with increased porosity as compared to the natural wood before chemical treatment;
after the removing, drying the piece of delignified wood by freeze drying or critical point drying to preserve a structure of cellulose-based lumina of the natural wood with increased porosity and such that the cellulose-based lumina remain open or unobstructed in a cross-sectional view; and
after the drying, chemically-treating the piece of delignified wood to be hydrophobic or providing the piece of delignified wood with a hydrophobic coating,
wherein after the drying, the piece of delignified wood is substantially white in color and exhibits a reflectivity of at least 90% in a wavelength range of 400-700 nm.

17. The method of claim 16, wherein the removing comprises immersing the piece of natural wood in a chemical solution comprising at least one of NaOH, $Na_2S$, $NaHSO_3$, $SO_2$, $H_2O$, $Na_2SO_3$, Anthraquinone (AQ), $Na_2Sn$ (where n is an integer), $CH_3OH$, $C_2H_5OH$, $C_4H_9OH$, HCOOH, $NH_3$, p-TsOH, $NH_3$-$H_2O$, $H_2O_2$, NaClO, $NaClO_2$, $CH_3COOH$ (acetic acid), $ClO_2$, and $Cl_2$.

18. The method of claim 16, wherein, after the drying the piece of delignified wood has:
a density less than that of the piece of natural wood prior to the removing at least 90% of lignin therefrom; or
an absorbance of less than or equal to 10% in a wavelength range of 400 nm to 1100 nm.

19. The method of claim 16, wherein the hydrophobic chemical treatment comprises at least one of epoxy resin, silicone oil, polyurethane, paraffin emulsion, acetic anhydride, octadecyltrichloro silane (OTS), 1H, 1H, 2H, 2-perfluorodecyltriethoxysilane, fluororesin, polydimethylsiloxane (PDMS), methacryloxymethyltrimethyl-silane (MSi), polyhedral oligomeric silsesquioxane (POSS), potassium methyl siliconate (PMS), dodecyl(trimethoxy) silane (DTMS), hexamethyldisiloxane, dimethyl diethoxy silane, tetraethoxysilane, methyltrichlorosilane, ethyltrimethoxysilane, methyl triethoxysilane, rimethylchlorosilane, phenyltrimethoxysilane, phenyltriethoxysilane, propyltrimethoxysilane, polymethyl methacrylate, polydiallyldimethylammonium chloride (polyDADMAC), 3-(trimethoxysilyl)propyl methacrylate (MPS, hydrophobic stearic acid, amphiphilic fluorinated triblock azide copolymers, polyvinylidene fluoride and fluorinated silane, n-dodecyltrimethoxysilane, and sodium lauryl sulfate.

20. The method of claim 16, wherein the removing comprises immersing the piece of natural wood in a first chemical solution followed by immersing in a second chemical solution, and wherein the first chemical solution comprises a mixture of NaOH and $Na_2SO_3$ and the second chemical solution comprises $H_2O_2$.

* * * * *